US010809826B2

(12) United States Patent
Kwon et al.

(10) Patent No.: US 10,809,826 B2
(45) Date of Patent: Oct. 20, 2020

(54) ELECTRONIC DEVICE AND METHOD FOR DISPLAYING AFFORDANCE FOR PROVIDING CHARGING OF BATTERY OF EXTERNAL DEVICE THROUGH DISPLAY

(71) Applicant: Samsung Electronics Co., Ltd., Suwon-si, Gyeonggi-do (KR)

(72) Inventors: Zion Kwon, Suwon-si (KR); Donghoon Kang, Suwon-si (KR); Jeonghoon Kim, Suwon-si (KR); Sangmin Shin, Suwon-si (KR); Hojin Jeon, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/533,290

(22) Filed: Aug. 6, 2019

(65) Prior Publication Data

US 2020/0042107 A1    Feb. 6, 2020

(30) Foreign Application Priority Data

Aug. 6, 2018    (KR) .......................... 10-2018-0091102

(51) Int. Cl.
*G06F 3/045*      (2006.01)
*G06F 3/038*      (2013.01)
(Continued)

(52) U.S. Cl.
CPC .......... *G06F 3/038* (2013.01); *G06F 3/03545* (2013.01); *G06F 3/0441* (2019.05);
(Continued)

(58) Field of Classification Search
CPC ........ G06F 3/0354; G06F 3/038; G06F 3/044; G06F 3/0441; G06F 2203/0384;
(Continued)

(56) References Cited

U.S. PATENT DOCUMENTS

2008/0055279 A1   3/2008  Osada et al.
2010/0277327 A1*  11/2010  Lee .......................... G06F 3/046
                                                           340/636.16
(Continued)

FOREIGN PATENT DOCUMENTS

JP    2013239009 A      11/2013
JP    2016-201023 A     12/2016
KR    10-2014-0024565 A  3/2014

OTHER PUBLICATIONS

International Search Report and Written Opinion of the International Searching Authority in connection with International Application No. PCT/KR2019/009743 dated Nov. 28, 2019, 9 pages.
European Search Report in connection with European Application No. 19190119.8 dated Nov. 27, 2019, 7 pages.

*Primary Examiner* — Joe H Cheng

(57) ABSTRACT

An electronic device includes a charging circuitry; a communication circuitry; a display; a processor; and a memory configured to store instructions that, when executed by the processor, cause the processor to: receive information regarding a remaining capacity of a rechargeable battery of a stylus related to the electronic device from the stylus by using the communication circuitry; based on it being identified that the remaining capacity of the battery is less than a reference value, display a first indication for guiding that charging of the battery is required by using the display; and, in response to it being identified that the stylus contacts the display while displaying the first indication, provide power for charging the battery by using the charging circuitry to the stylus, and to change the first indication to a second indication for indicating that the battery is being charged by using the display.

20 Claims, 17 Drawing Sheets

(51) Int. Cl.
*G06F 3/0354* (2013.01)
*G06F 3/044* (2006.01)
*H02J 50/80* (2016.01)
*H02J 50/10* (2016.01)
*H02J 7/02* (2016.01)
*H02J 50/90* (2016.01)
*H02J 7/34* (2006.01)

(52) U.S. Cl.
CPC .............. *H02J 7/025* (2013.01); *H02J 7/027* (2013.01); *H02J 50/10* (2016.02); *H02J 50/80* (2016.02); *H02J 50/90* (2016.02); *G06F 2203/0384* (2013.01); *H02J 7/345* (2013.01)

(58) Field of Classification Search
CPC ........ H02J 7/0048; H02J 7/0049; H02J 7/025; H02J 7/027; H02J 7/345; H02J 50/90; H02J 2310/22
See application file for complete search history.

(56) References Cited

U.S. PATENT DOCUMENTS

| | | | |
|---|---|---|---|
| 2013/0106723 A1 | 5/2013 | Bakken et al. | |
| 2014/0078116 A1 | 3/2014 | Mercea et al. | |
| 2014/0253025 A1 | 9/2014 | Van Wiemeersch et al. | |
| 2014/0300586 A1* | 10/2014 | Dowd | G06F 3/03545 345/179 |
| 2016/0266742 A1* | 9/2016 | Hussain | G06F 3/04842 |
| 2016/0299585 A1* | 10/2016 | Lee | G06F 3/0416 |
| 2016/0320830 A1* | 11/2016 | Jakoboski | G06F 3/03545 |
| 2017/0068339 A1* | 3/2017 | Zimmerman | G06F 3/03545 |
| 2017/0115755 A1* | 4/2017 | Jung | G06F 1/26 |
| 2018/0069955 A1 | 3/2018 | Kim et al. | |
| 2018/0173330 A1 | 6/2018 | Lee et al. | |
| 2019/0369755 A1* | 12/2019 | Roper | G06F 3/0481 |
| 2020/0012353 A1* | 1/2020 | Kim | H02J 7/025 |
| 2020/0050242 A1* | 2/2020 | Seo | H04W 4/80 |
| 2020/0097118 A1* | 3/2020 | Kang | G06F 3/0354 |
| 2020/0103988 A1* | 4/2020 | Jeon | G06F 3/04162 |

* cited by examiner

ELECTRONIC DEVICE AND METHOD FOR DISPLAYING AFFORDANCE FOR PROVIDING CHARGING OF BATTERY OF EXTERNAL DEVICE THROUGH DISPLAY

CROSS-REFERENCE TO RELATED APPLICATION

This application is based on and claims priority under 35 U.S.C. § 119 to Korean Patent Application No. 10-2018-0091102 filed on Aug. 6, 2018 in the Korean Intellectual Property Office, the disclosure of which is herein incorporated by reference in its entirety.

BACKGROUND

1. Field

Various embodiments relate to an electronic device which displays an affordance for providing charging of a battery of an external device through a display, and a method thereof.

2. Description of Related Art

Electronic devices including touch screens are developing to provide intuitive interactions. Such an electronic device may provide various functions based on a touch input received from an external device such as a stylus.

The above information is presented as background information only to assist with an understanding of the disclosure. No determination has been made, and no assertion is made, as to whether any of the above might be applicable as prior art with regard to the disclosure.

SUMMARY

An external device (for example, a stylus) causing a touch input on a touch screen of an electronic device may include a rechargeable battery for the sake of portability. Therefore, the electronic device cooperating with the external device may require a solution for guiding charging of the battery of the external device.

The technical objects to be achieved by the disclosure are not limited to those mentioned above, and other technical objects that are not mentioned above may be clearly understood to those skilled in the art based on the description provided below.

An electronic device according to various embodiments may include: a housing including a first plate and a second plate facing in an opposite direction of the first plate; a touch screen display panel visible through at least a part of the first plate; at least one conductive coil disposed inside the display panel or adjacent to the display panel, and configured to generate an electromagnetic wave through the first plate; a wireless communication circuitry disposed inside the housing; a processor disposed inside the housing and operatively connected with the display panel, the wireless communication circuitry, and the at least one conductive coil; and a memory operatively connected with the processor and storing instructions that, when executed by the processor, cause the processor to: receive charging state information of a charge storage element from a stylus pen including the charge storage element through the wireless communication circuitry; determine an amount of an electric charge of the storage element based at least in part on the received information; and provide a graphic user interface (GUI) on the display panel to display a position of the at least one conductive coil based at least in part on the determination.

An electronic device according to various embodiments may include: a charging circuitry; a communication circuitry; a display; a processor; and a memory configured to store instructions that, when executed by the processor, cause the processor to: receive information for indicating a remaining capacity of a rechargeable battery of a stylus related to the electronic device from the stylus by using the communication circuitry; display a visual affordance for indicating that charging of the battery is required by using the display, based on the received information; and, in response to identifying that the stylus contacts the display, provide power for charging the battery by using the charging circuitry to the stylus, and display an indication for indicating an efficiency of the charging in the visual affordance by using the display.

An electronic device according to various embodiments may include: a charging circuitry; a communication circuitry; a display; a processor, and a memory configured to store instructions that, when executed by the processor, cause the processor to: receive information regarding a remaining capacity of a rechargeable battery of a stylus related to the electronic device from the stylus by using the communication circuitry; based on identifying that the remaining capacity of the battery is less than a reference value, display a first indication for guiding that charging of the battery is required by using the display; and, in response to identifying that the stylus contacts the display while displaying the first indication, provide power for charging the battery by using the charging circuitry to the stylus, and change the first indication to a second indication for indicating that the battery is being charged by using the display.

A method for operating an electronic device according to various embodiments may include: receiving information for indicating a remaining capacity of a rechargeable battery of a stylus related to the electronic device from the stylus; displaying a visual affordance for indicating that charging of the battery is required, based on the received information; and, in response to identifying that the stylus contacts the display, providing power for charging the battery to the stylus through the display, and displaying an indication for indicating an efficiency of the charging in the visual affordance by using the display.

A method for operating an electronic device according to various embodiments may include: receiving information regarding a remaining capacity of a rechargeable battery of a stylus related to the electronic device from the stylus; based on identifying that the remaining capacity of the battery is less than a reference value, displaying a first indication for guiding that charging of the battery is required; and, in response to identifying that the stylus contacts the display while displaying the first indication, providing power for charging the battery to the stylus through the display, and changing the first indication to a second indication for indicating that the battery is being charged by using the display.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
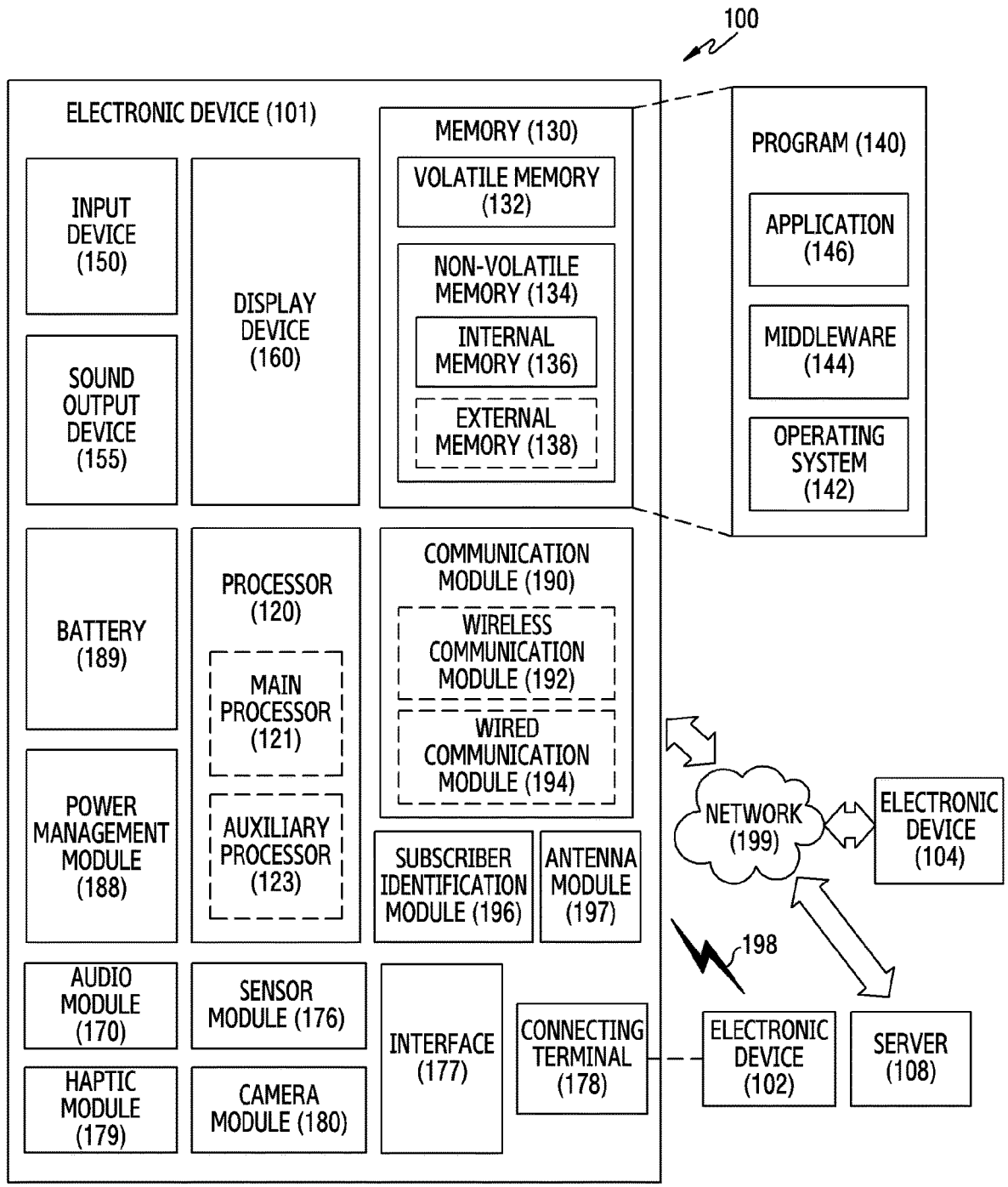
FIG. 1 is a block diagram illustrating an electronic device 101 in a network environment 100 according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
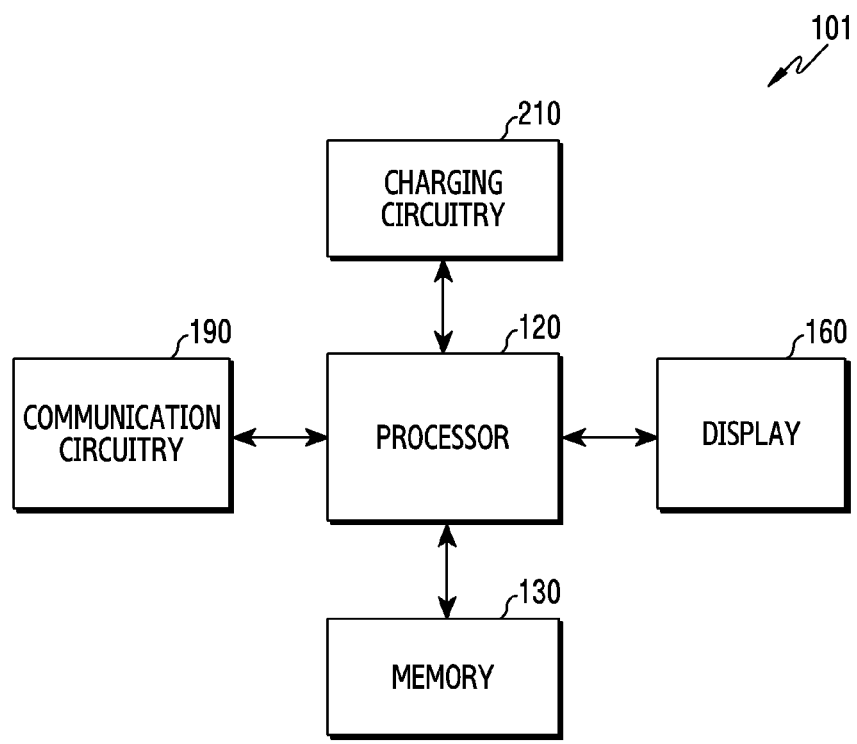
FIG. 2 is a view illustrating an example of a functional configuration of an electronic device according to various embodiments.

FIG. 2 is a view illustrating an example of a functional configuration of an electronic device according to various embodiments. The functional configuration may be included in the electronic device 101 illustrated in FIG. 1.

Referring to FIG. 2, the electronic device 101 may include a processor 120, a memory 130, a display 160, a communication circuitry 190, and a charging circuitry 210.

In various embodiments, the processor 120 may include the processor 120 illustrated in FIG. 1, the memory 130 may include the memory 130 illustrated in FIG. 1, the display 160 may include the display device 160 illustrated in FIG. 1, and the communication circuitry 190 may include the communication module 190 illustrated in FIG. 1.

In various embodiments, the charging circuitry 210 may be configured to provide power to an electronic device 102 (for example, an input means such as a stylus) which is related to the electronic device 101 and includes a rechargeable battery to charge the battery of the electronic device 102. In various embodiments, the electronic device 102 may be an electronic which causes a touch input on the display 160 of the electronic device 101. In various embodiments, the electronic device 102 may be an electronic device which is independent from the electronic device 101. In various embodiments, the electronic device 102 may be an electronic device which is removably inserted to a holder exposed through at least a part of a first surface of a housing (not shown) of the electronic device 101. In various embodiments, the charging circuitry 210 may be disposed under at least a part of the display 160. For example, the charging circuitry 210 may be disposed under the entire area of the display 160 exposed through the housing (not shown). In another example, the charging circuitry 210 may be disposed under a part of the entire area. However, this should not be considered as limiting.

In various embodiments, the processor 120 may be operatively (or operably) coupled with the elements in the electronic device 101 (for example, the memory 130, the display 160, the communication circuitry 190, the charging circuitry 210, etc.) to control the elements.

In various embodiments, the processor 120 may receive, from the electronic device 102, information for indicating a remaining capacity of the rechargeable battery of the electronic device 102, by using the communication circuitry 190. For example, the processor 120 may receive the information for indicating the remaining capacity of the battery from the electronic device 102 through a Bluetooth low energy (BLE) communication path by using the communication circuitry 190. In various embodiments, the information for indicating the remaining capacity of the battery may be transmitted to the electronic device 101 from the electronic device 102 based on a specified condition. For example, the information for indicating the remaining capacity of the battery may be transmitted to the electronic device 101 from the electronic device 102 when the electronic device 102 attached to the electronic device 101 by the holder is detached from the electronic device 101. In another example, the information for indicating the remaining capacity of the battery may be transmitted to the electronic device 101 from the electronic device 102 every time it is identified that a specified period arrives in the electronic device 102. The specified period may be changed adaptively according to at least one of a state of a battery of the electronic device 101, a state of the battery of the electronic device 102, and a communication state between the electronic device 101 and the electronic device 102. In still another example, the information for indicating the remaining capacity of the battery may be transmitted to the electronic device 101 from the electronic device 102 every time it is identified that the remaining capacity of the battery in the electronic device 102 reaches at least one reference value (for example, 90%, 80%, 70%, . . . , 30%, 20%, 10%, 5%, etc.). Each of the at least one reference value may be changed adaptively according to at least one of the state of the battery of the electronic device 101, the state of the battery of the electronic device 102, and the communication state between the electronic device 101 and the electronic device 102. In yet another example, the information for indicating the remaining capacity of the battery may be transmitted to the electronic device 101 from the electronic device 102 every time it is identified that a state of a communication circuitry of the electronic device 102 is changed in the electronic device 102 (for example, an enabled state is changed to a disabled state or a disabled state is changed to an enabled state). However, this should not be considered as limiting.

In various embodiments, the processor 120 may compare the remaining capacity of the battery indicated by the received information with a reference value (or a threshold value). In various embodiments, the threshold value may be used or configured in the electronic device 101 to identify whether a visual affordance, which will be described below, will be displayed. For example, when it is identified that the remaining capacity of the battery indicated by the received information is less than the reference value as a result of comparing, the processor 120 may display the visual affordance by using the display 160. In another example, when it is identified that the remaining capacity of the battery indicated by the received information is greater than or equal to the reference value as a result of comparing, the processor 120 may restrict displaying the visual affordance. However, this should not be considered as limiting. For example, the processor 120 may display information regarding the remaining capacity of the battery by using the display 160 in response to the information for indicating the remaining capacity of the battery being received. In other words, the comparing may be omitted according to embodiments.

In various embodiments, the processor 120 may display a visual affordance for indicating that the charging of the battery of the electronic device 102 is required by using the display 160, based on the received information. In various embodiments, the visual affordance may be referred to as a visual cue. In various embodiments, the processor 120 may charge the battery by providing power to the electronic device 102 by using the charging circuitry 210.

Figure 3:
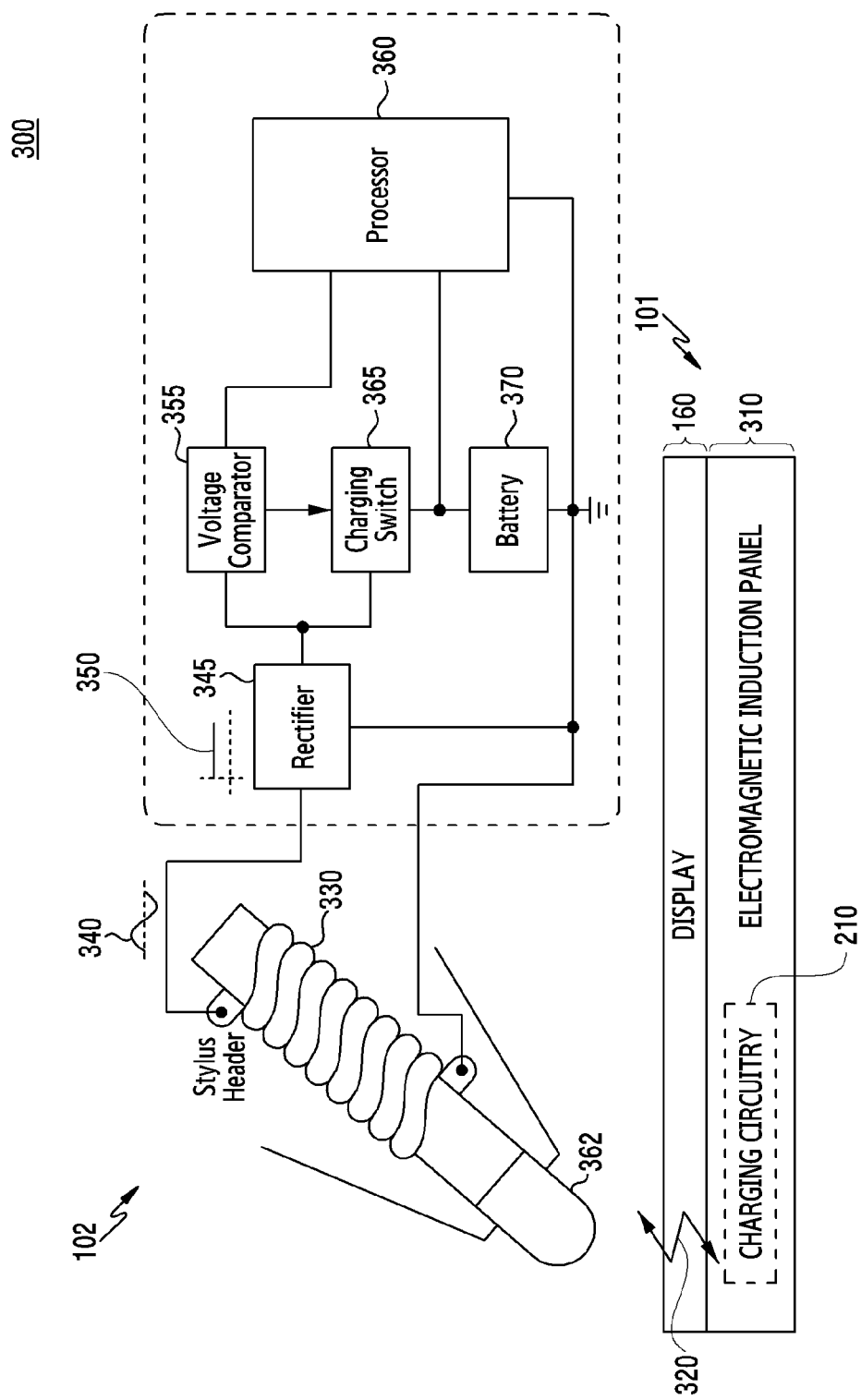
FIG. 3 is a view illustrating an example of an electronic device which transmits an electromagnetic signal, and an example of the electronic device which receives the electromagnetic signal according to various embodiments.

FIG. 3 is a view illustrating an example 300 of the electronic device which transmits an electromagnetic signal and the electronic device which receives the electromagnetic signal according to various embodiments.

For example, referring to FIG. 3, the charging circuitry 210 may be included in an electromagnetic induction panel 310 (for example, a digitizer) disposed under the display 160. In various embodiments, the charging circuitry 210 may include a detecting coil. In various embodiments, the processor 120 may provide power for charging the battery to the electronic device 102 by transmitting an electromagnetic (EM) signal 320 by using the detecting coil included in the charging circuitry 210. The electromagnetic signal 320 may be applied or allowed to a coil 330 of the electronic device 102 through the detecting coil. An electromagnetic signal 340 corresponding to the electromagnetic signal 320 may be generated or obtained by applying the electromagnetic signal 320 to the coil 330. In various embodiments, the electromagnetic signal 340 may be configured with alternating current (AC) power. In various embodiments, the electromagnetic signal 340 may be provided to a rectifier 345. The rectifier 345 may convert the electromagnetic signal 340 configured with the AC power into an electromagnetic signal 350 configured with direct current (DC) power. In various embodiments, the rectifier 345 may be configured with at least one diode. In various embodiments, the rectifier 345 may provide the electromagnetic signal 350 converted from the electromagnetic signal 340 to a voltage comparator 355. A processor 360 of the electronic device 102 may measure a voltage of the DC power of the electromagnetic signal 350 by using the voltage comparator 355. For example, when the measured voltage corresponds to a first voltage, the processor 360 may identify that the electronic device 102 is in a first state in which the electronic device 102 performs drawing, and may control elements of the electronic device 102 to perform an operation corresponding to the first state. In another example, when the measured voltage corresponds to a second voltage distinct from the first voltage, the processor 360 may identify that the electronic device 102 is in in a second state in which power is obtained through the display 160 of the electronic device 101, and may control the elements of the electronic device 102 to perform an operation corresponding to the second state. In various embodiments, the second state may refer to a state in which a tip 362 of the electronic device 102 is positioned on the display 160, or a state in which a distance between the tip 362 of the electronic device 102 and the display 160 is shorter than a specified distance. In still another example, when the measured voltage corresponds to a third voltage which is distinct from the first voltage and the second voltage, the processor 360 may identify that the electronic device 102 is in a third state in which the electronic device 102 is inserted into the holder of the electronic device 101, and may control the elements of the electronic device 102 to perform an operation corresponding to the third state. In various embodiments, the third state may refer to a state in which the electronic device 102 is inserted into the electronic device 101 by being attached to the holder. For example, when it is identified that the electronic device 102 is in the first state, the processor 360 may control a charging switch 365 to restrict providing the DC power of the electromagnetic signal 350 to a rechargeable battery 370. In another example, when it is identified that the electronic device 102 is in the second state or the third state, the processor 360 may control the charging switch 365 to provide the DC power of the electromagnetic signal 350 to the rechargeable battery 370 and to charge the rechargeable battery 370. In various embodiments, a magnitude of the DC power provided to the battery 370 in the third state may be greater than a magnitude of the DC power provided to the battery 370 in the second state. However, this should not be considered as limiting.

In various embodiments, the visual affordance displayed based on the received information may be implemented in various methods.

Figure 4A:
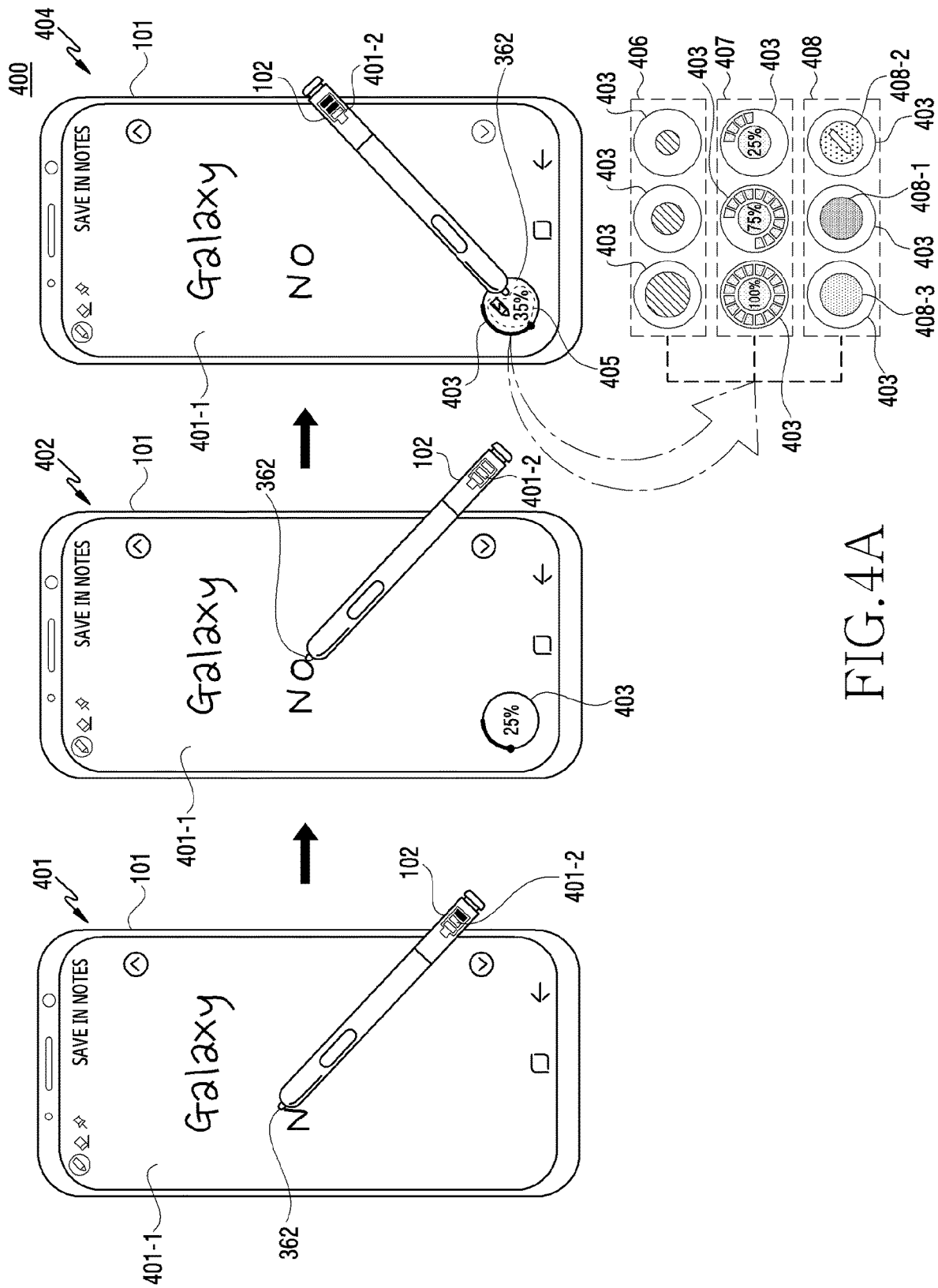
FIG. 4A is a view illustrating an example of an affordance provided by the electronic device according to various embodiments.
Figure 4B:
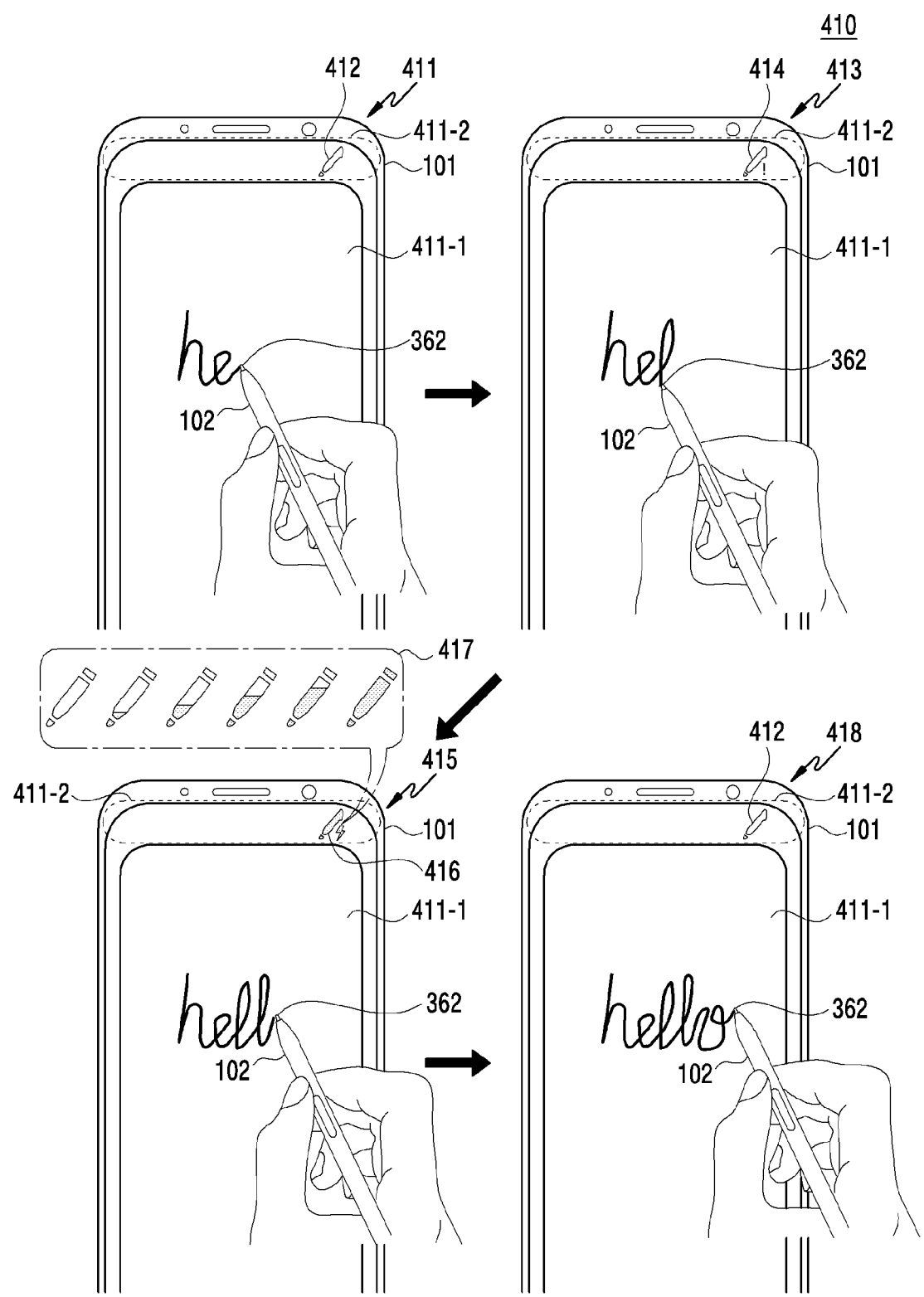
FIG. 4B is a view illustrating an example of an affordance provided by the electronic device according to various embodiments.
Figure 4C:
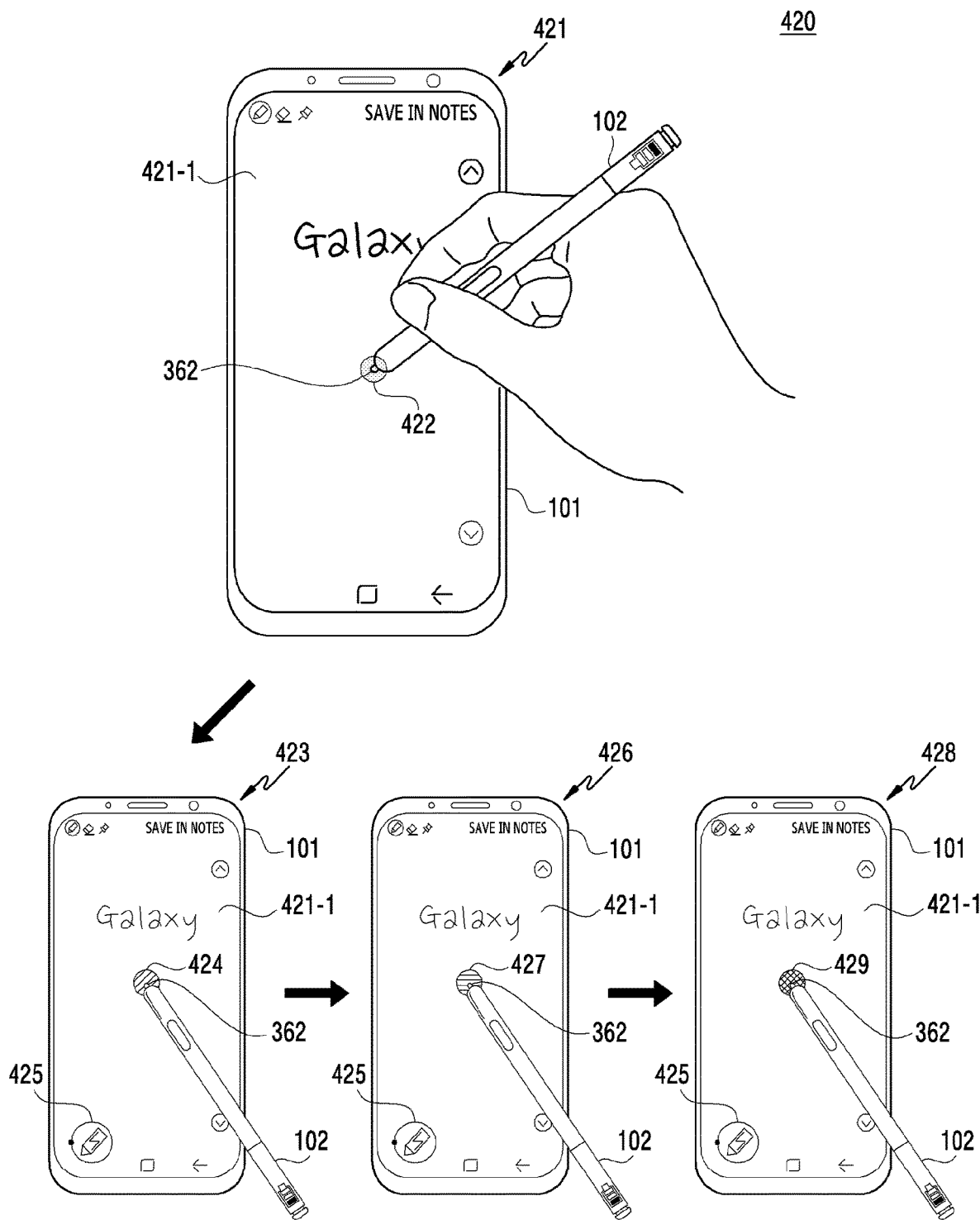
FIG. 4C is a view illustrating an example of an affordance provided by the electronic device according to various embodiments.
Figure 4D:
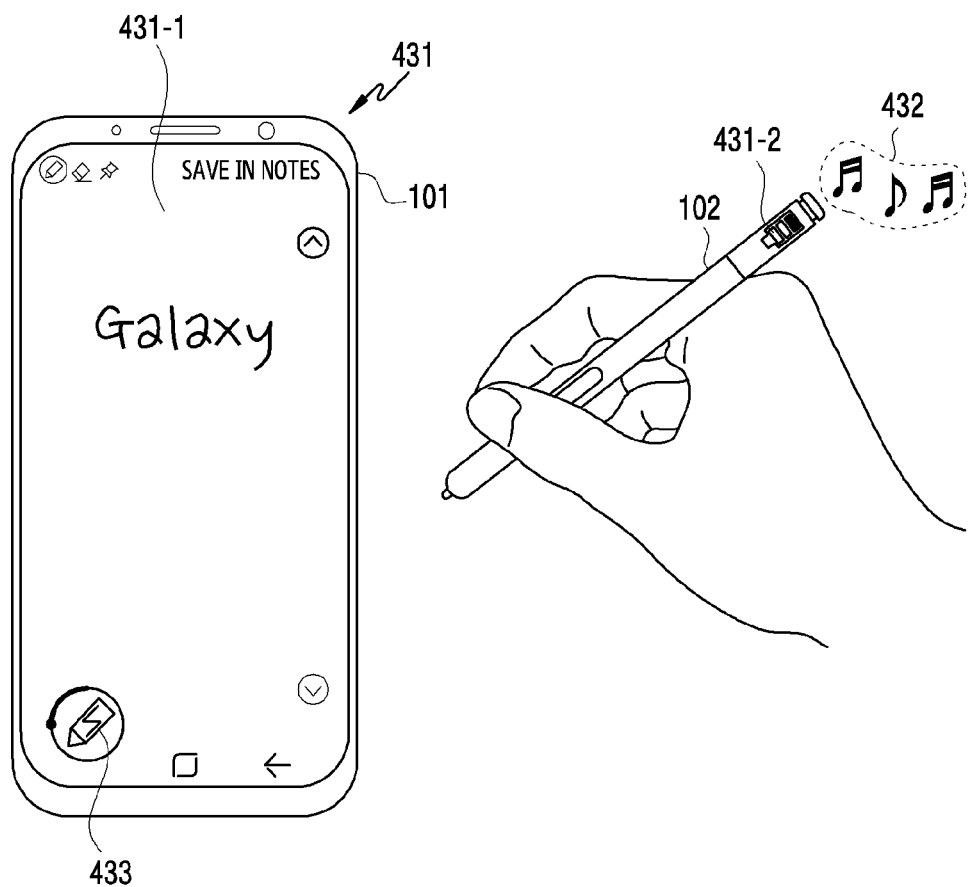
FIG. 4D is a view illustrating an example of an affordance provided by the electronic device according to various embodiments.
Figure 4E:
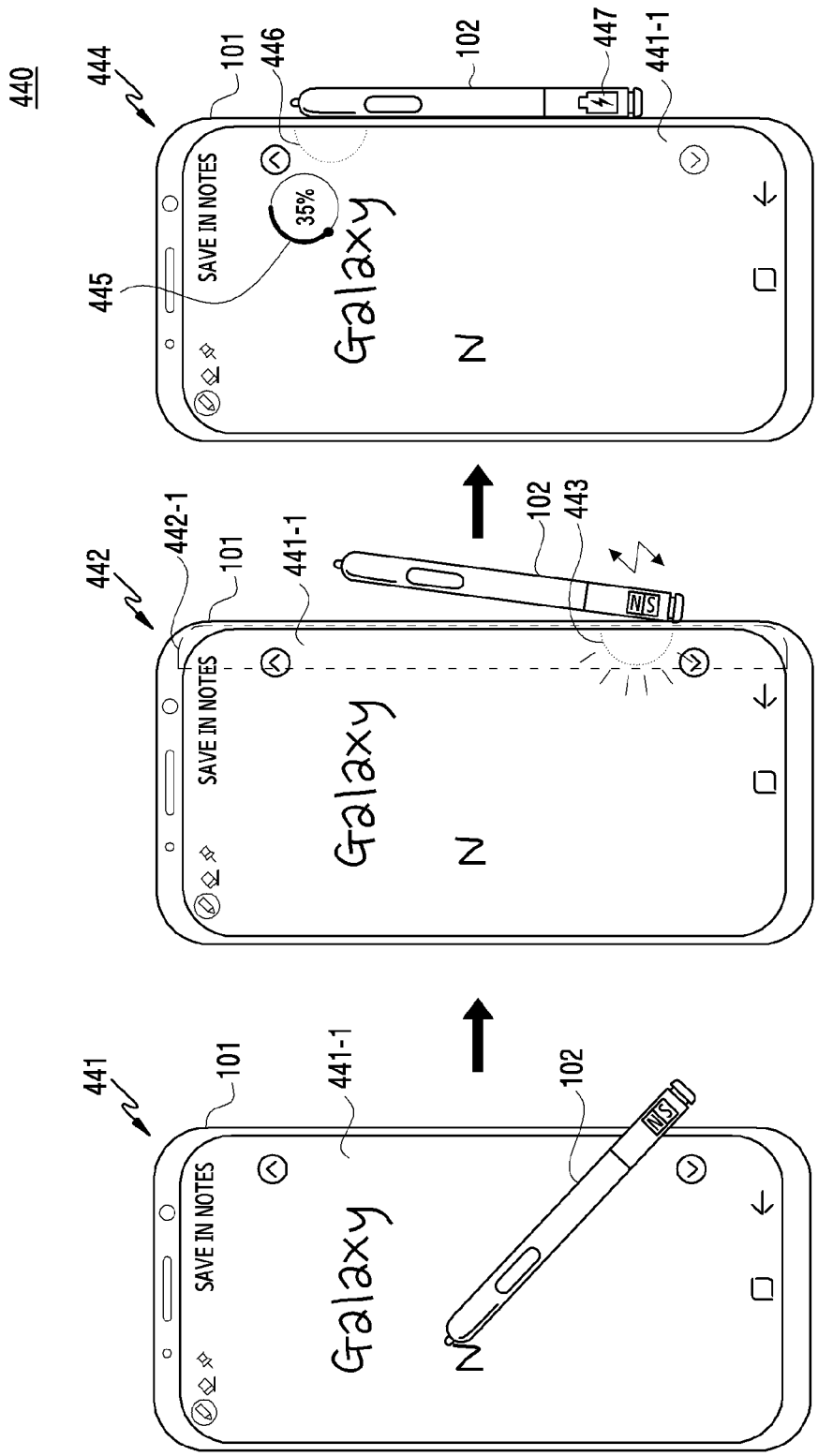
FIG. 4E is a view illustrating an example of an affordance provided by the electronic device according to various embodiments.
Figure 4F:
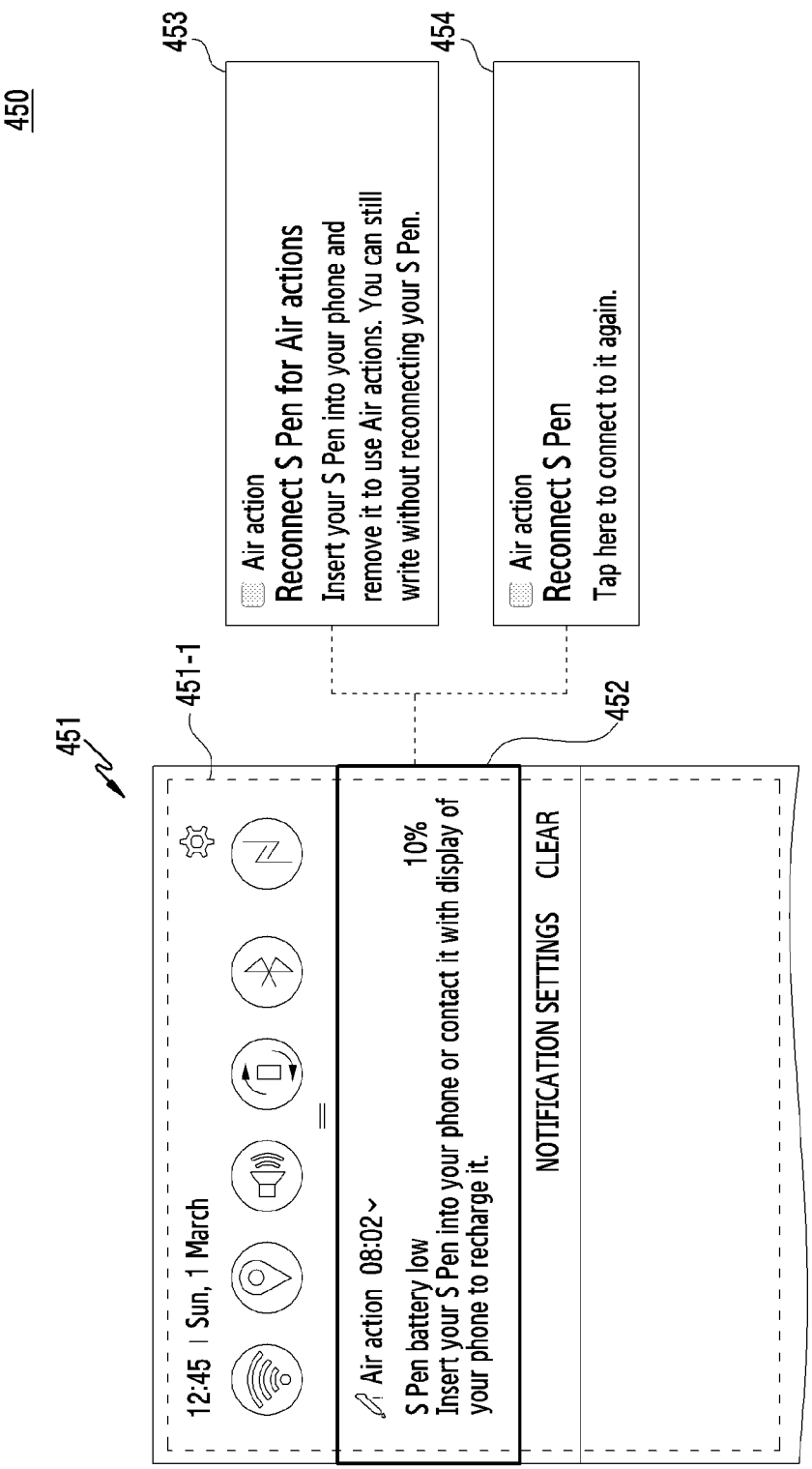
FIG. 4F is a view illustrating an example of an affordance provided by the electronic device according to various embodiments.
Figure 4G:
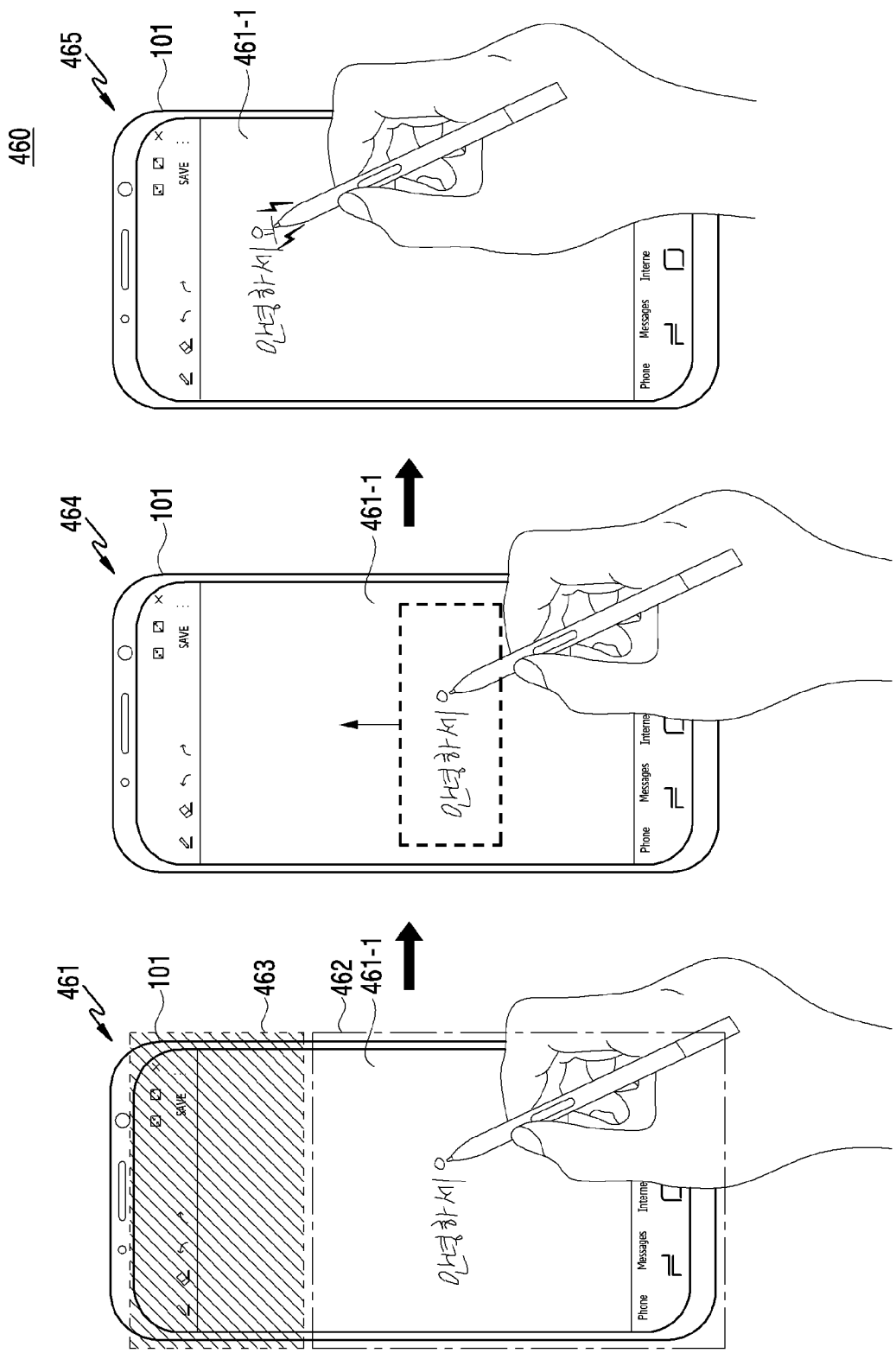
FIG. 4G is a view illustrating an example of an affordance provided by the electronic device according to various embodiments.

FIG. 4A is a view illustrating an example 400 of an affordance provided by the electronic device according to various embodiments, FIG. 4B is a view illustrating an example 410 of an affordance provided by the electronic device according to various embodiments, FIG. 4C is a view illustrating an example 420 of an affordance provided by the electronic device according to various embodiments; FIG. 4D is a view illustrating an example 430 of an affordance provided by the electronic device according to various embodiments, FIG. 4E is a view illustrating an example 440 of an affordance provided by the electronic device according to various embodiments, FIG. 4F is a view illustrating an example 450 of an affordance provided by the electronic device according to various embodiments, and FIG. 4G is a view illustrating an example 460 of an affordance provided by the electronic device according to various embodiments.

For example, referring to FIG. 4A, in a state 401, the processor 120 may receive a touch input from the electronic device 102 while displaying a user interface 401-1 of a memo application. In the state 401, the processor 120 may receive information for indicating a remaining capacity of the rechargeable battery 370 of the electronic device 102 from the electronic device 102 by using the communication circuitry 190. In various embodiments, the information 401-2 for indicating the remaining capacity of the battery 370 may be displayed through a part of the housing of the electronic device 102. The processor 120 may change the state 401 to a state 402 based on it being identified that the remaining capacity of the battery 370 indicated by the received information is less than a reference value. In various embodiments, the state 402 may refer to a state in which a visual affordance 403 is displayed. In various embodiments, the visual affordance 403 may be displayed on the display 160 to indicate that charging of the battery 370 is required. In various embodiments, the visual affordance 403 may include information regarding the remaining capacity of the battery 370 to indicate that charging of the battery 370 is required. In various embodiments, the visual affordance 403 may be displayed in an area where the battery 370 can be charged by contact between the display 160 and the tip 362. In various embodiments, the visual affordance 403 may be superimposed on at least a part of the memo application. In various embodiments, the visual affordance 403 may be displayed as floated. The floated visual affordance 403 may be moved to another area from the initial display area by a touch input. However, this should not be considered as limiting.

In another example, referring to FIG. 4B, in a state 411, the processor 120 may receive a touch input from the electronic device 102 while displaying a user interface 411-1 of a memo application. In the state 411, the processor 120 may display, in an indicator area 411-2, an indication 412 for indicating that the electronic device 101 is paired with the electronic device 102. In various embodiments, the indicator area 411-2 may refer to an area that is maintained independently from or regardless of transition of a content (or screen) displayed on the other area of the full display area of the display 160. For example, the indicator area may include an object for indicating an antenna gain of cellular communication, an object for indicating whether a WiFi function is enabled, an object for indicating a remaining capacity of a rechargeable battery of the electronic device 101. In the state 411, the processor 120 may receive information for indicating a remaining capacity of the rechargeable battery 370 of the electronic device 102 from the electronic device 102 by using the communication circuitry 190. In various embodiments, the information for indicating the remaining capacity of the battery 370 of the electronic device 102 may be displayed through a part of the housing of the electronic device 102. The processor 120 may change the state 411 to a state 413 based on it being identified that the remaining capacity of the battery 370 of the electronic device 102 indicated by the received information is less than a reference value. In various embodiments, the state 413 may refer to a state in which an indication 414 is displayed as a visual affordance. In various embodiments, the indication 414 may be displayed in the indicator area as a visual affordance to indicate that charging of the battery 370 of the paired electronic device 102 is required. In various embodiments, the indication 414 may further include information regarding the remaining capacity of the battery 370 to indicate that charging of the battery 370 of the paired electronic device 102 is required.

In still another example, referring to FIG. 4C, in a state 421, the processor 120 may receive a touch input from the electronic device 102 while displaying a user interface 421-1 of a memo application. In the state 421, the processor 120 may display an area where the tip 362 contacts the display 160 as an area 422 having a first color. In various embodiments, the area 422 having the first color may refer to at least a part of a path of the touch input. In various embodiments, the first color may be used to indicate that a remaining capacity of the battery 370 of the electronic device 102 is greater than or equal to a first reference value. In various embodiments, the area 422 having the first color may be changed or converted into another color distinct from the first color after a specified time is elapsed from the time that the area 422 is displayed in the first color. In various embodiments, another color may be a color of the path of the touch input defined or configured in the memo application (for example, a color set by a user input from colors included in a palette displayed in the memo application). In the state 421, the processor 120 may receive information for indicating the remaining capacity of the rechargeable battery 370 of the electronic device 102 from the electronic device 102 by using the communication circuitry 190. In various embodiments, the information for indicating the remaining capacity of the battery 370 of the electronic device 102 may be displayed through a part of the housing of the electronic device 102. The processor 120 may change the state 421 to a state 423 based on it being identified that the remaining capacity of the battery 370 of the electronic device 102 indicated by the received information is less than the first reference value. In various embodiments, the state 423 may refer to a state in which an area where the tip 362 of the electronic device 102 contacts the display 160 is displayed as an area 424 having a second color as a visual affordance. In various embodiments, the second color may be used to indicate that the remaining capacity of the battery 370 of the electronic device 102 is less than the first reference value. In various embodiments, the area 424 having the second color may be changed or converted into another color distinct from the second color after a specified time is elapsed from the time that the area 424 is displayed in the second color. In various embodiments, while displaying the area 424 having the second color in the second color, the processor 120 may further display a visual affordance 425. In various embodiments, the visual affordance 425 may be used to indicate an area where the battery 370 of the electronic device 102 can be charged in the full display area of the display 160, or may be used to indicate that power is being provided to the battery 370 of the electronic device 102. In various embodiments, when the visual affordance 425 is used to indicate the area where the battery 370 of the electronic device 102 can be charged, the processor 120 may receive information for indicating the remaining capacity of the battery 370 of the electronic device 102 from the electronic device 102 by using the communication circuitry 190 in the state 423. The processor 120 may change the state 423 to a state 426 based on it being identified that the remaining capacity of the battery 370 of the electronic device 102 indicated by the received information is less than a second reference value which is smaller than the first reference value in the state 423. In various embodiments, the state 426 may refer to a state in which the area where the tip 362 of the electronic device 102 contacts the display 160 is displayed as an area 427 having a third color as a visual affordance. In various embodiments, the third color may be used to indicate that the remaining capacity of the battery 370 of the electronic device 102 is less than the second reference value. In various embodiments, the area 427 having the third color may be changed or converted into another color distinct from the third color after a specified time is elapsed from the time that the area 427 is displayed in the third color. In various embodiments, while displaying the area 427 having the third color in the third color, the processor 120 may further display the visual affordance 425. In various embodiments, the visual affordance 425 may be used to indicate the area where the battery 370 of the electronic device 102 can be charged. In various embodiments, in the state 426, the processor 120 may receive information for indicating a remaining capacity of the battery 370 from the electronic device 102 by using the communication circuitry 190. The processor 120 may change the state 426 to a state 428, based on it being identified that the remaining capacity of the battery 370 of the electronic device 102 indicated by the received information is less than a third reference value which is smaller than the second reference value in the state 426. In various embodiments, the state 428 may refer to a state in which the area where the tip 362 of the electronic device 102 contacts the display 160 is displayed as an area 429 having a fourth color as a visual affordance. In various embodiments, the fourth color may be used to indicate that the remaining capacity of the battery 370 of the electronic device 102 is less than the third reference value, or to indicate that the battery 370 of the electronic device 102 lies immediately before being discharged. In various embodiments, the area 429 having the fourth color may be changed or converted into another color distinct from the fourth color after a specified time is elapsed from the time that the area 429 is displayed in the fourth color. In various embodiments, while displaying the area 429 having the fourth color in the fourth color, the processor 120 may further display the visual affordance 425. In various embodiments, the visual affordance may be used to indicate the area where the battery 370 of the electronic device 102 can be charged.

In yet another example, referring to FIG. 4D, in a state 431, the processor 120 may display a user interface 431-1 of a memo application. In the state 431, the processor 120 may receive information for indicating a remaining capacity of the rechargeable battery 370 of the electronic device 102 from the electronic device 102 by using the communication circuitry 190. In various embodiments, the information 431-2 for indicating the remaining capacity of the battery 370 of the electronic device 102 may be displayed through a part of the housing of the electronic device 102. The processor 120 may perform an operation for providing at least one of an auditory affordance or a haptic affordance which is distinct from a visual affordance, based on it being identified that the remaining capacity of the battery 370 of the electronic device 102 indicated by the received information is less than a reference value. For example, in order to provide the auditory affordance, the processor 120 may transmit, to the electronic device 102 by using the communication circuitry 190, a signal for requesting the electronic device 102 to output an audio signal 432 through a speaker of the electronic device 102. In another example, the processor 120 may output an audio signal (not shown) through a speaker (not shown) of the electronic device 101 in order to provide the auditory affordance. In still another example, in order to provide the haptic affordance, the processor 120 may transmit, to the electronic device 102 by using the communication circuitry 190, a signal for requesting the electronic device 102 to output a vibration through a motor (not shown), a piezoelectric element (not shown), or an electric stimulus device (not shown) of the electronic device 102. In yet another example, the processor 120 may output a vibration by using a haptic module 179 (not shown in FIG. 2) in order to provide the haptic affordance. However, this should not be considered as limiting. In various embodiments, the processor 120 may display a visual affordance 433 by using the display 160, along with the operation for providing at least one of the auditory affordance or the haptic affordance, based on it being identified that the remaining capacity of the battery 370 of the electronic device 102 indicated by the received information is less than the reference value. In various embodiments, the visual affordance 433 may be used to indicate an area where the battery 370 of the electronic device 102 can be charged in the full display area of the display 160, or may be displayed to indicate that charging of the battery 370 of the electronic device 102 is required.

In further example, referring to FIG. 4E, in a state 441, the processor 120 may receive a touch input from the electronic device 102 while displaying a user interface 441-1 of a memo application. In the state 441, the processor 120 may receive information for indicating a remaining capacity of the rechargeable battery 370 of the electronic device 102 from the electronic device 102 by using the communication circuitry 190. The processor 120 may change the state 441 to a state 442 based on it being identified that the remaining capacity of the battery 370 of the electronic device 102 indicated by the received information is less than a reference value. In various embodiments, the state 442 may refer to a state in which a visual affordance 443 is displayed in an edge area 442-1 of the display 160 corresponding to a side surface of the housing of the electronic device 101 to which the electronic device 102 is attachable. In various embodiments, the visual affordance 443 may disappear after a specified time is elapsed from the time that the visual affordance 443 is displayed. However, this should not be considered as limiting. In various embodiments, the electronic device 102 may display an indication for indicating that the electronic device 102 can be attached to the side surface of the housing of the electronic device 101 in a partial area of the housing of the electronic device 102. In various embodiments, the processor 120 may change the state 442 to a state 444 based on it being identified that the electronic device 102 is attached to the side surface of the housing of the electronic device 101 in the state 442. In various embodiments, the state 444 may refer to a state in which power for charging the battery 370 of the electronic device 102 attached to the side surface of the housing of the electronic device 101 is provided. In various embodiments, in the state 444, the processor 120 may display at least one visual affordance (for example, at least one of a visual affordance 445 or a visual affordance 446) for indicating that power is being provided to the electronic device 102 by using the display 160. In the state 444, the electronic device 102 may display an indication 447 for indicating that the battery 370 of the electronic device 102 is being charged through a part of the housing of the electronic device 102. In various embodiments, the indication for indicating that the battery 370 of the electronic device 102 is being charged may be converted or changed from the indication indicating that the electronic device 102 can be attached to the side surface of the housing of the electronic device 101. However, this should not be considered as limiting.

In still further example, referring to FIG. 4F, the processor 120 may receive information for indicating a remaining capacity of the battery 370 of the electronic device 102 from the electronic device 102. As in a state 451, the processor 120 may display a notification message 452 for indicating that charging of the battery 370 of the electronic device 102 is required, within a quick panel 451-1 as a visual affordance, based on it being identified that the remaining capacity of the battery 370 of the electronic device 102 indicated by the received information is less than a reference value. In various embodiments, the quick panel may be displayed on the display 160 in response to a drag input moving from an edge area of the display 160 to another area. In various embodiments, the notification message 452 may include information for guiding an action of a user that is required to charge the battery 370 of the electronic device 102. In various embodiments, the processor 120 may display another notification message distinct from the notification message 452 within the quick panel. For example, when the electronic device 102 is detached from the electronic device 101 and a connection is not established between the electronic device 101 and the electronic device 102, the processor 120 may display, within the quick panel, a notification message 453 or a notification message 454 indicating that a connection between the electronic device 101 and the electronic device 102 is used to be established to use an enhanced function of the electronic device 102. However, this should not be considered as limiting.

In yet further example, referring to FIG. 4G, the processor 120 may receive a touch input from the electronic device 102 while displaying a user interface 461-1 of a memo application. In a state 461, the processor 120 may receive information for indicating a remaining capacity of the rechargeable battery 370 of the electronic device 102 from the electronic device 102 by using the communication circuitry 190. The processor 120 may change the state 461 to a state 464 based on it being identified that the remaining capacity of the battery 370 of the electronic device 102 indicated by the received information is less than a reference value. In various embodiments, the state 464 may refer to a state in which an area for receiving the touch input moves from an area 462 having low efficiency of charging of the battery 370 to an area 463 having high efficiency of charging of the battery 370. In other words, the processor 120 may implicitly provide a visual affordance by adjusting or changing a representation of the user interface, based on it being identified that the remaining capacity of the battery 370 of the electronic device 102 indicated by the received information is less than the reference value. In various embodiments, while receiving a touch input from the electronic device 102 in the state 464, the processor 120 may provide power for charging the battery 370 to the electronic device 102 as in a state 465.

In various embodiments, the processor 120 may display the visual affordance by combining at least one of the methods for displaying the visual affordance described through FIGS. 4A, 4B, 4C, 4D, 4E, 4F, and 4G.

In various embodiments, while providing at least one of the visual affordance, the auditory affordance, or the haptic affordance, the processor 120 may identify that the electronic device 102 (or the tip 362 of the electronic device 102) is positioned within a specified distance from the display 160. For example, while providing at least one of the visual affordance, the auditory affordance, or the haptic affordance, the processor 120 may identify that the electronic device 102 contacts the display 160. In another example, while enabling the charging circuitry 210, the processor 120 may identify that the electronic device 102 hovers over the display 160. However, this should not be considered as limiting.

In various embodiments, in response to it being identified that the electronic device 102 (or the tip 362 of the electronic device 102) is positioned within the specified distance from the display 160 while providing at least one of the visual affordance, the auditory affordance, or the haptic affordance, the processor 120 may enable the charging circuitry 210. For example, the processor 120 may enable the charging circuitry 210 by providing or applying a current, a voltage, or power to the detecting coil included in the charging circuitry 210 in response to the identification. In various embodiments, the processor 120 may identify that the electronic device 102 (or the tip 362 of the electronic device 102) is positioned within the specified distance from the display 160 by using a touch sensor included in or functionally connected with the display 160, and may enable the charging circuitry 210 in response to the identification. For example, when the touch sensor is configured by a capacitive touch sensor, the processor 120 may identify that the electronic device 102 (or the tip 362 of the electronic device 102) is positioned within the specified distance from the display 160 based on a change of capacitance being detected, and may enable the charging circuitry 210 in response to the identification. However, this should not be considered as limiting.

In various embodiments, the electronic device 101 may enable the charging circuitry 210 on condition that it is identified that the electronic device 102 (or the tip 362 of the electronic device 102) is positioned within the specified distance from the display 160 while providing at least one of the visual affordance, the auditory affordance, or the haptic affordance, such that an electromagnetic signal generated from the charging circuitry 210 can be prevented from influencing the display 160 and the touch sensor as a noise.

In various embodiments, the processor 120 may provide power for charging the battery 370 of the electronic device 102 to the electronic device 102 by using the enabled charging circuitry 210. For example, power (or voltage, current, etc.) provided to the charging circuitry 210 under control of the processor 120 may cause an electromagnetic signal (for example, the electromagnetic signal 320) to be generated. The generated electromagnetic signal may be applied to the coil 330 of the electronic device 102. The electromagnetic signal applied to the coil 330 may generate another electromagnetic signal (for example, the electromagnetic signal 340). The another electromagnetic signal may provide DC power to the battery 370 based on control of the processor 360 of the electronic device 102.

In various embodiments, the processor 120 may display an indication for indicating a charging state of the battery 370 of the electronic device 102 while providing the power for charging the battery 370 of the electronic device 102. In various embodiments, the indication for indicating the charging state of the battery 370 may be used to indicate that the battery 370 of the electronic device 102 is being charged. In various embodiments, the indication for indicating the charging state of the battery 370 of the electronic device 102 may be used to indicate efficiency of charging of the battery 370 of the electronic device 102 according provision of the power. In various embodiments, the efficiency of the charging may refer to a rate at which the remaining capacity of the battery 370 increases. In various embodiments, the efficiency of the charging may be changed according to a change of a posture of the electronic device 102. However, this should not be considered as limiting. In various embodiments, the change of the posture of the electronic device 102 may be identified by the processor 120 based on a signal that is received from the electronic device 102 and causes an input on the display 160. For example, the processor 120 may identify the change of the posture of the electronic device 102, based on at least one of a change of a reception intensity of the signal, a change of a position where the signal is received, or a distribution of frequency (or phase) of the signal on the electromagnetic induction panel 310. In various embodiments, the charging state of the battery 370 of the electronic device 102 may be used to indicate a change (or increase) of the remaining capacity of the battery 370 according to the provision of the power. However, this should not be considered as limiting.

In various embodiments, information regarding the efficiency of the charging of the battery 370 of the electronic device 102 may be obtained by the electronic device 101 (for example, the processor 120) through various methods. For example, the processor 120 may obtain the information regarding the efficiency of the charging of the battery 370 of the electronic device 102 from the electronic device 102 by using the communication circuitry 190. In another example, the processor 120 may periodically obtain information regarding a changed remaining capacity of the battery 370 from the electronic device 102 by using the communication circuitry 190 while providing power to the electronic device 102, and may calculate information regarding the efficiency of the charging of the battery 370 based on the obtained information regarding the changed remaining capacity of the battery 370. In still another example, the processor 120 may obtain the information regarding the efficiency of the charging of the battery 370 based a position relationship between the tip 362 of the electronic device 102 and the display 160 (or touch sensor) (for example, a distance between the tip 362 and the display 160, an angle between a direction in which the tip 362 is headed, and a direction in which the display 160 faces. However, this should not be considered as limiting.

In various embodiments, the indication for indicating the charging state of the battery 370 of the electronic device 102 may be configured with various shapes.

For example, referring to FIG. 4A, in the state 402, the processor 120 may identify that the electronic device 102 is positioned within a designated distance from the display 160 (or the visual affordance 403). The processor 120 may change the state 402 to a state 404 based on the identification. In various embodiments, the state 404 may refer to a state in which the processor 120 provides the indication for indicating the charging state of the battery 370 in the visual affordance 403 while providing the power for charging the battery 370 to the electronic device 102. For example, in the state 404, the visual affordance 403 may include an indication 405 for indicating information regarding a remaining capacity of the battery changed according to the charging.

In various embodiments, the visual affordance 403 in the state 404 may include an indication 406 which is distinct from the indication 405, and indicates efficiency of charging of the battery 370. For example, a representation of the indication 406 may be changed based on a change of the efficiency of the charging of the battery 370. For example, when it is identified that the efficiency of the charging of the battery 370 increases, the processor 120 may enlarge the size of the indication 406. In another example, when it is identified that the efficiency of the charging of the battery 370 is reduced, the processor 120 may reduce the size of the indication 406. However, this should not be considered as limiting.

In various embodiments, the visual affordance 403 in the state 404 may include an indication 407 which is distinct from the indication 405 and the indication 406, and indicates a current remaining capacity of the battery 370. For example, a representation of the indication 407 may be changed according to a change of the remaining capacity of the battery 370. For example, the processor 120 may change a number for indicating a remaining capacity of the battery 370 to indicate that the remaining capacity of the battery 370 increases according to the charging of the battery 370 (for example, 25%→75%→100%). In another example, the processor 120 may change a representation of a gauge for indicating a remaining capacity of the battery 370 to indicate that the remaining capacity of the battery 370 increases according to the charging of the battery 370.

In various embodiments, the visual affordance 403 in the state 404 may include an indication 408 which is distinct from the indication 405, the indication 406, and the indication 407, and indicates a current charging state of the battery 370. For example, a representation of the indication 408 may be changed according to a change of the charging state caused by the provision of the power. For example, the processor 120 may display an indication 408-1 to indicate that the battery 370 is being charged. In another example, the processor 120 may display an indication 408-2 to indicate that the battery 370 is before being charged. In still another example, the processor 120 may display an indication 408-3 to indicate that the battery 370 is fully charged. However, this should not be considered as limiting.

In various embodiments, the processor 120 may display at least two of the indication 406, the indication 407, or the indication 408 in the visual affordance 403 simultaneously. For example, the processor 120 may change the size of the indication 408-1 according to a change of the efficiency of the charging of the battery 370 in order to indicate the efficiency of the charging of the battery 370 and the charging state of the battery 370 simultaneously.

In another example, referring to FIG. 4B, in the state 413, the processor 120 may identify that the electronic device 102 is positioned within a specified distance from the display 160. The processor 120 may change the state 413 to a state 415 based on the identification. In various embodiments, the state 415 may refer to a state in which the indication for indicating the charging state of the battery 370 is displayed in the indicator area. For example, in the state 415, the processor 120 may change the indication 414 to an indication 416. In various embodiments, the indication 416 may be used to indicate that the battery 370 is being charged.

In various embodiments, in the state 415, the processor 120 may change the indication 416 to an indication 417 for indicating a change of the remaining capacity of the battery 370 according to the charging.

In various embodiments, the processor 120 may identify that the battery 370 is fully charged by the provision of the power. The processor 120 may change the state 415 to a state 418 in response to it being identified that the battery 370 is fully charged by the provision of the power. In various embodiments, the state 418 may refer to a state in which the indication 416 or the indication 417 is restored to the indication 412. In various embodiments, the processor 120 may change the indication 416 or the indication 417 to the indication 412 in response to it being identified that the battery 370 is fully charged, such that the user can recognize completion of the charging of the battery 370 of the electronic device 102.

Figure 5:
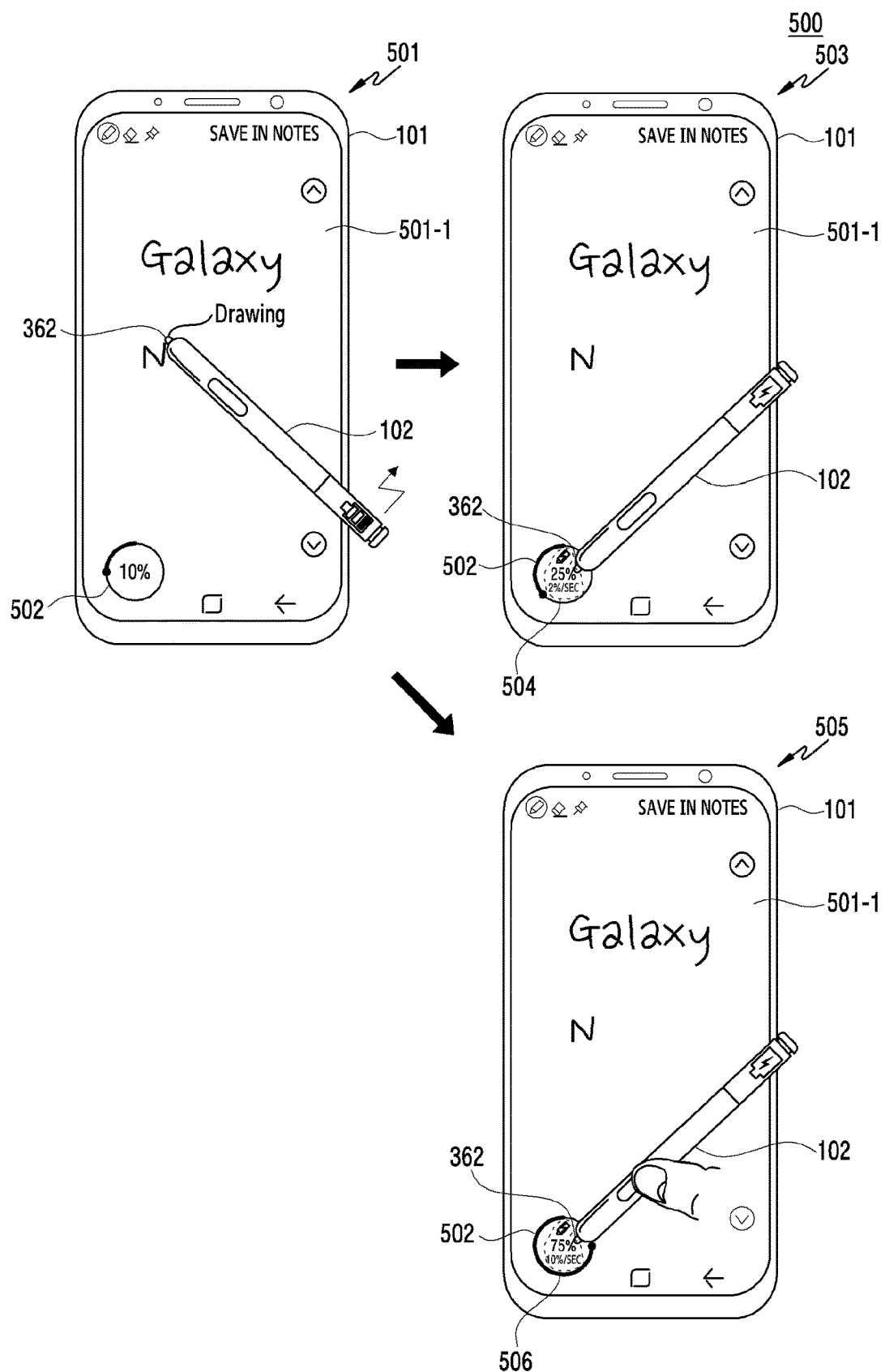
FIG. 5 is a view illustrating an example of an indication displayed in the electronic device according to various embodiments.

FIG. 5 is a view illustrating an example 500 of an indication displayed in the electronic device according to various embodiments.

In various embodiments, the processor 120 may provide power for quick charging of the battery 370 of the electronic device 102. In various embodiments, providing the power for quick charging of the battery 370 of the electronic device 102 may be triggered based on a user input on the electronic device 102. In various embodiments, the user input may include pression of a physical button exposed through at least a part of the housing of the electronic device 102.

For example, referring to FIG. 5, in a state 501, the processor 120 may receive information for indicating a remaining capacity of the battery 370 of the electronic device 102 from the electronic device 102 by using the communication circuitry 190. In the state 501, the processor 120 may display a visual affordance 502 including the information for indicating the remaining capacity of the battery 370 by superimposing the same on a user interface of a memo application 501-1, based on it being identified that the remaining capacity of the battery 370 of the electronic device 102 indicated by the information is less than a reference value. In various embodiments, a position where the visual affordance 502 is displayed may be a position where power can be provided to the electronic device 102 by contact between the display 160 and the tip 362 of the electronic device 102.

In various embodiments, when the tip 362 of the electronic device 102 contacts the visual affordance 502 without pression of the physical button as in a state 503, the processor 120 may provide power to the electronic device 102 by using the charging circuitry 210 to perform normal charging (distinct from the quick charging) of the battery 370 of the electronic device 102. When the processor 120 provides power to the electronic device 102 by using the charging circuitry 210 to perform normal charging of the battery 370 of the electronic device 102, an electromagnetic signal (for example, the electromagnetic signal 320) emitted from the electromagnetic induction panel 310 may not influence at least one of the display 160 or the touch sensor as a noise, or may influence as a low noise. Therefore, the processor 120 may configure at least one of the display 160 or the touch sensor to be able to receive a touch input from the electronic device 102. In various embodiments, in the state 503, the processor 120 may display an indication 504 in the visual affordance 502 to indicate that a service for normal charging is being provided. For example, the indication 504 may be used to indicate not only the information regarding the remaining capacity of the battery 370 but also information regarding a charging rate corresponding to normal charging.

In various embodiments, when the tip 362 of the electronic device 102 contacts the visual affordance 502 with pression of the physical button being received in the electronic device 102 as in a state 505, the processor 120 may provide power to the electronic device 102 by using the charging circuitry 210 in order to perform quick charging of the battery 370. In various embodiments, receiving the pression of the physical button in the electronic device 102 may be recognized by the processor 120 in various methods. For example, the processor 120 may recognize that the pression of the physical button in the electronic device 102 is received, by receiving information for indicating that the physical button is pressed from the electronic device 102 by using the communication circuitry 190. In another example, the processor 120 may recognize that the pression of the physical button is received in the electronic device 102 by detecting a change of a dielectric constant of the tip 362 caused by the pression of the physical button. However, this should not be considered as limiting. Unlike the case where normal charging is provided, when quick charging is provided to the electronic device 102, an electromagnetic signal (for example, the electromagnetic signal 320) emitted from the electromagnetic induction panel 310 may influence at least one of the display 160 or the touch sensor as a noise. In various embodiments, in the state 505, the processor 120 may restrict some of the functions provided by at least one of the display 160 or the touch sensor in consideration of that the electromagnetic signal influences at least one of the display 160 or the touch sensor as a noise. In the state 505, the processor 120 may display an indication 506 in the visual affordance 502 to indicate that the service for quick charging is being provided. For example, the indication 506 may be used to indicate not only the information regarding the remaining capacity of the battery 370 of the electronic device 102 but also information regarding a charging rate corresponding to quick charging.

Figure 6:
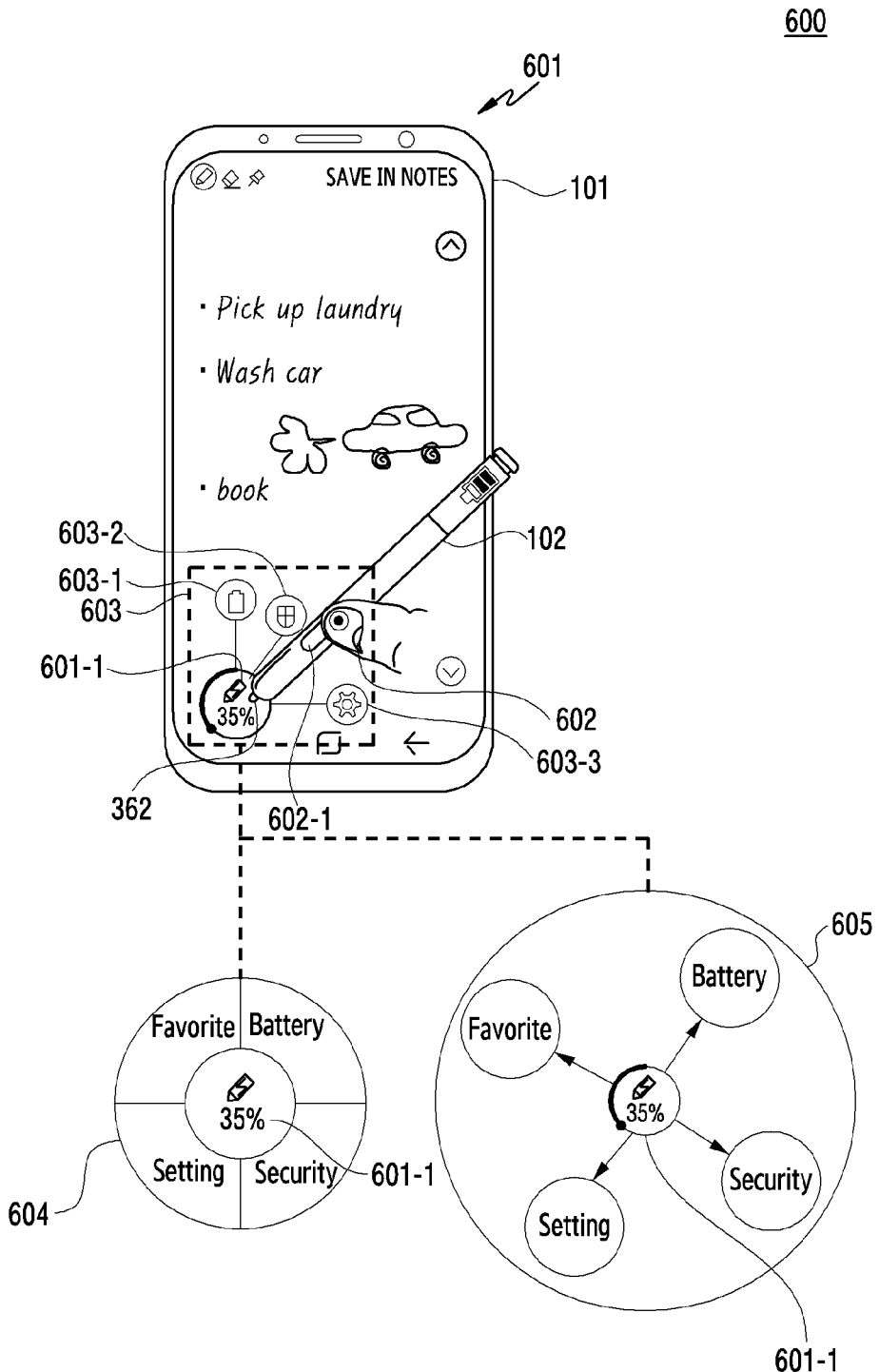
FIG. 6 is a view illustrating an example of an indication displayed in the electronic device according to various embodiments.

FIG. 6 is a view illustrating an example 600 of an indication displayed in the electronic device according to various embodiments.

In various embodiments, the processor 120 may provide various functions based on a user input received at the electronic device 102 from a user while providing power for charging the battery 370 to the electronic device 102. In various embodiments, the user input may include a gesture of the user possessing the electronic device 102. In various embodiments, the user input may include a pression of the physical button exposed through at least a part of the housing of the electronic device 102. However, this should not be considered as limiting. In various embodiments, the processor 120 may display a plurality of items in proximity to a visual affordance 601-1 to provide the various functions. For example, referring to FIG. 6, the processor 120 may recognize that the physical button 602-1 of the electronic device 102 is pressed (for example, an input 602 on the physical button 602-1) while providing power for charging the battery 370 to the electronic device 102 as in a state 601. The processor 120 may display a plurality of items 603 based on the identification. In various embodiments, the plurality of items 603 may be displayed to indicate the plurality of functions, respectively. For example, a first item 603-1 of the plurality of items 603 may indicate a function for changing a state related to use of the battery 370 (for example, a function for disabling or restricting an operation of requiring use of the battery 370), a second item 603-2 of the plurality of items 603 may indicate a function for changing a security state of the electronic device 101 related to the electronic device 102 (for example, a function for maintaining a locking state of the electronic device 101 as a unlock state when the electronic device 102 is positioned within a specified distance from the display 160), and a third item 603-3 of the plurality of items 603 may indicate a function for changing setting of the electronic device 102 in the electronic device 101. However, this should not be considered as limiting.

In various embodiments, the plurality of items 603 may be displayed on the display 160 of the electronic device 101 in various shapes. For example, the processor 120 may display a circular user interface 604 surrounding the visual affordance 601-1 based on it being recognized that the physical button of the electronic device 102 is pressed while providing power for charging the battery 370 to the electronic device 102. In various embodiments, the circular user interface 604 may include a plurality of items (for example, Battery, Security, Setting, Favorite) for indicating the plurality of functions, respectively. For example, the circular user interface 604 may include at least one of the first item (for example, Battery), the second item (for example, Security), the third item (for example, Setting), or a fourth item (for example, Favorite) for accessing a function of the electronic device 102 designated by a user (that is, a bookmark function). In another example, the processor 120 may display a user interface 605 in an area including the visual affordance 601-1, based on it being recognized that the physical button of the electronic device 102 is pressed and the tip 362 of the electronic device 102 is held in the visual affordance 601-1, while providing power for charging the battery 370 to the electronic device 102. In various embodiments, the processor 120 may trace a path of the electronic device 102 based on a user input while displaying the user interface 605. In various embodiments, the user interface 605 may display a plurality of images (for example, Battery, Security, Setting, Favorite) for indicating a plurality of destinations. For example, the plurality of images may indicate the first item (for example, Battery), the second item (for example, Security), the third item (for example, Setting), and the fourth item (for example, Favorite), respectively. In various embodiments, based on a user input for dropping the visual affordance 601-1 on one image of the plurality of images, the processor 120 may provide a function corresponding to the one image. However, this should not be considered as limiting.

Figure 7A:
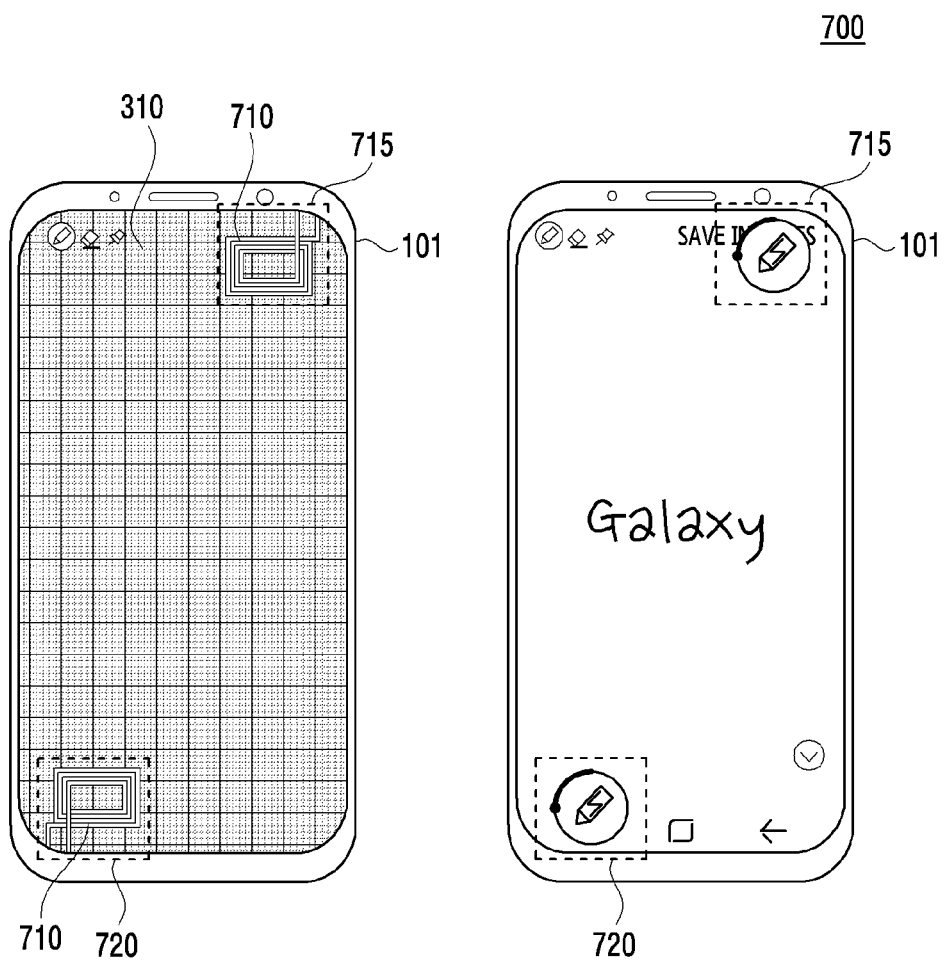
FIG. 7A is a view illustrating an example of the electronic device which displays a visual affordance in a certain area of the display according to various embodiments.

FIG. 7A is a view illustrating an example 700 of the electronic device which displays a visual affordance in a certain area of the display according to various embodiments.

Figure 7B:
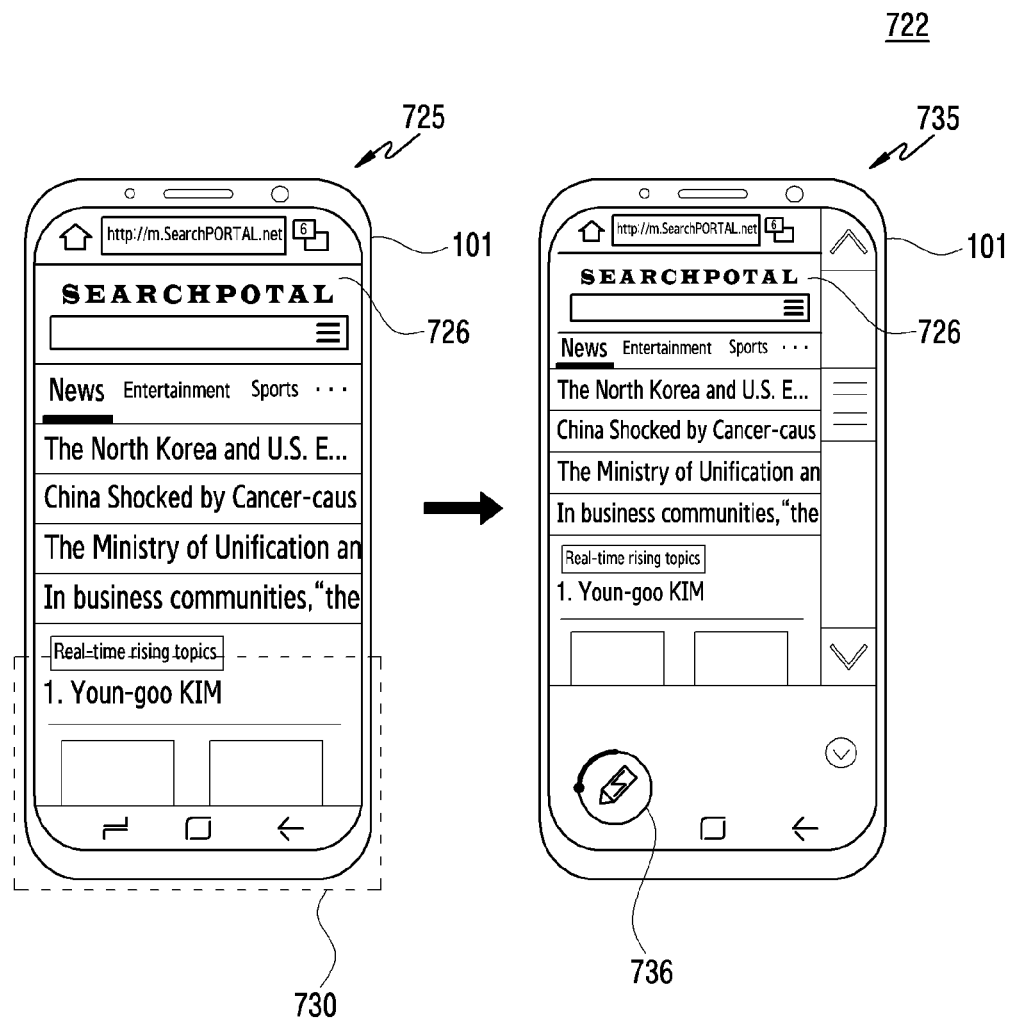
FIG. 7B is a view illustrating an example of the electronic device which changes a representation of a user interface displayed according to various embodiments.

FIG. 7B is a view illustrating an example 722 of the electronic device which changes a representation of a user interface displayed according to various embodiments.

In various embodiments, when the charging circuitry 210 is positioned under a certain area of the full display area of the display 160 exposed through a part of the housing of the electronic device 101, or there is a certain area capable of providing high charging efficiency in the full display area of the display 160, the processor 120 may guide the position of the certain area by using a visual affordance. For example, referring to FIG. 7A, the electromagnetic induction panel 310 disposed under the display 160 may include a detecting coil 710 in a certain area of the full area on which the electromagnetic induction panel 310 is disposed. For example, the detecting coil may be included in at least one of an area 715 and an area 720. The processor 120 may guide an area where charging of the battery 370 can be provided, by displaying the visual affordance for indicating that charging of the battery 370 of the electronic device 102 is required in at least one of an area disposed on the area 715 of the full display area of the display 160 or an area disposed on the area 720.

In another example, referring to FIG. 7B, the electromagnetic induction panel 310 disposed under the display 160 may include the detecting coil in an area 730. In various embodiments, the processor 120 may provide a visual affordance for guiding an area where charging of the battery 370 can be provided, by changing an arrangement or representation of a screen displayed on the display 160, based on it being identified that charging of the battery 370 is required. For example, in a state 725, the processor 120 may display a user interface 726 of an Internet browser. The processor 120 may identify that charging of the battery 370 is required while displaying the user interface 726. The processor 120 may change an arrangement or representation of the user interface 726 to guide the tip 362 of the electronic device 102 to contact the area 730 based on the identification. For example, the processor 120 may display the user interface 726 in a reduced size as in a state 735 changed from the state 725. The processor 120 may display a visual affordance 736 for indicating that charging of the battery 370 is required in an area separated from the area where the user interface 726 having the reduced size is displayed, or in an area distinct from the area where the user interface 726 having the reduced size is displayed. However, this should not be considered as limiting. For example, the visual affordance 736 may be superimposed on the user interface 726. In this case, the size of the user interface may be maintained unlike in the example of FIG. 7B.

As described above, the electronic device 101 according to various embodiments may provide various affordances (for example, a visual affordance, an auditory affordance, a haptic affordance, or the like) based on various methods, such that the user can easily charge the battery 370 of the electronic device 102 by bringing the electronic device 102 into contact with the display 160 of the electronic device 101. In other words, the electronic device 101 according to various embodiments can provide an enhanced user experience.

As described above, an electronic device (for example, the electronic device 101) according to various embodiments may include a charging circuitry (for example, the charging circuitry 210), a communication circuitry (for example, the communication circuitry 190), a display (for example, the display 160), and at least one memory (for example, the memory 130) configured to store instructions; and at least one processor (for example, the processor 120). When executing the instructions, the at least one processor may be configured to: receive information for indicating a remaining capacity of a rechargeable battery of a stylus related to the electronic device from the stylus by using the communication circuitry; display a visual affordance for indicating that charging of the battery is required by using the display, based on the received information; and, in response to it being identified that the stylus contacts the display, provide power for charging the battery by using the charging circuitry to the stylus, and to display an indication for indicating an efficiency of the charging in the visual affordance by using the display.

In various embodiments, when executing the instructions, the at least one processor may be configured to display the visual affordance by using the display in response to it being identified that the remaining capacity of the battery indicated by the received information is less than a reference value.

In various embodiments, the visual affordance may further include an indication for indicating information regarding the remaining capacity of the battery indicated by the received information.

In various embodiments, when executing the instructions, the at least one processor may further be configured to change a representation of the displayed indication, based on it being identified that the efficiency of the charging is changed while providing the power to the stylus by using the charging circuitry. In various embodiments, the change of the efficiency of the charging may be caused by at least one of a change of a distance between the stylus and the charging circuitry, or a change of a posture of the stylus. In various embodiments, when executing the instructions, the at least one processor may be configured to change the representation of the displayed indication by changing a size of the indication, based on it being identified that the efficiency of the charging is changed while providing the power to the stylus by using the charging circuitry.

In various embodiments, when executing the instructions, the at least one processor may be configured to cease displaying the visual affordance including the indication in response to information for indicating that the battery is fully charged being received by using the communication circuitry.

In various embodiments, the visual affordance may include another indication for guiding that the battery can be charged by contact with the visual affordance before the identification, and the indication may be changed from the another indication in response to the identification.

In various embodiments, the electronic device may further include a housing to mount the charging circuitry, the communication circuitry, the display, the at least one memory, and the at least one processor, and the display may be exposed through at least a part of the housing, and the charging circuitry may be disposed under at least a part of the display. In various embodiments, the visual affordance may be displayed within an area disposed on the charging circuitry in the full display area of the display.

As described above, an electronic device (for example, the electronic device 101) according to various embodiments may include a charging circuitry (for example, the charging circuitry 210), a communication circuitry (for example, the communication circuitry 190), a display (for example, the display 160), at least one memory (for example, the memory 130) configured to store instructions, and at least one processor (for example, the processor 120). When executing the instructions, the at least one processor may be configured to: receive information regarding a remaining capacity of a rechargeable battery of a stylus related to the electronic device from the stylus by using the communication circuitry; based on it being identified that the remaining capacity of the battery is less than a reference value, display a first indication for guiding that charging of the battery is required by using the display; and, in response to it being identified that the stylus contacts the display while displaying the first indication, provide power for charging the battery by using the charging circuitry to the stylus, and to change the first indication to a second indication for indicating that the battery is being charged by using the display.

In various embodiments, when executing the instructions, the at least one processor may be configured to display the first indication for guiding that the charging of the stylus is required in an indicator area of a full display area of the display by using the display, based on it being identified that the remaining capacity of the battery is less than the reference value. In various embodiments, when executing the instructions, the at least one processor may further be configured to display a screen in at least a part of the other area of the full display area of the display along with the first indication, and the indicator area may be maintained independently from transition of the screen displayed on the at least part of the other area.

In various embodiment, when executing the instructions, the at least one processor may further be configured to cease displaying the second indication based on it being identified that the stylus is separated from the display. In various embodiments, when executing the instructions, the at least one processor may further be configured to: identify that the stylus is separated from the display; in response to it being identified that the remaining capacity of the battery is less than the reference value at a time that the stylus is separated from the display, cease displaying the second indication by changing the second indication to the first indication.

In various embodiments, when executing the instructions, the at least one processor may further be configured to: while providing the power and displaying the second indication, receive another information regarding the remaining capacity of the battery from the stylus by using the communication circuitry; identify that the battery is fully charged based on the another information; and, in response to it being identified that the battery is fully charged, change the second indication to a third indication for indicating that the battery is fully charged.

In various embodiments, the second indication may further be used to indicate a change of the remaining capacity of the battery while providing the power.

In various embodiments, when executing the instructions, the at least one processor may further be configured to cease displaying the first indication based on it being identified that a connection between the stylus and the electronic device is terminated.

In various embodiments, when executing the instructions, the at least one processor may be configured to: display a third indication for indicating that the stylus is connected to the electronic device while maintaining a connection between the stylus and the electronic device; and, based on it being identified that the remaining capacity of the battery is less than the reference value while displaying the third indication, display the first indication changed from the third indication by using the display. In various embodiments, when executing the instructions, the at least one processor may be configured to maintain displaying the third indication based on it being identified that the remaining capacity of the battery is greater than or equal to the reference value while displaying the third indication.

Figure 8:
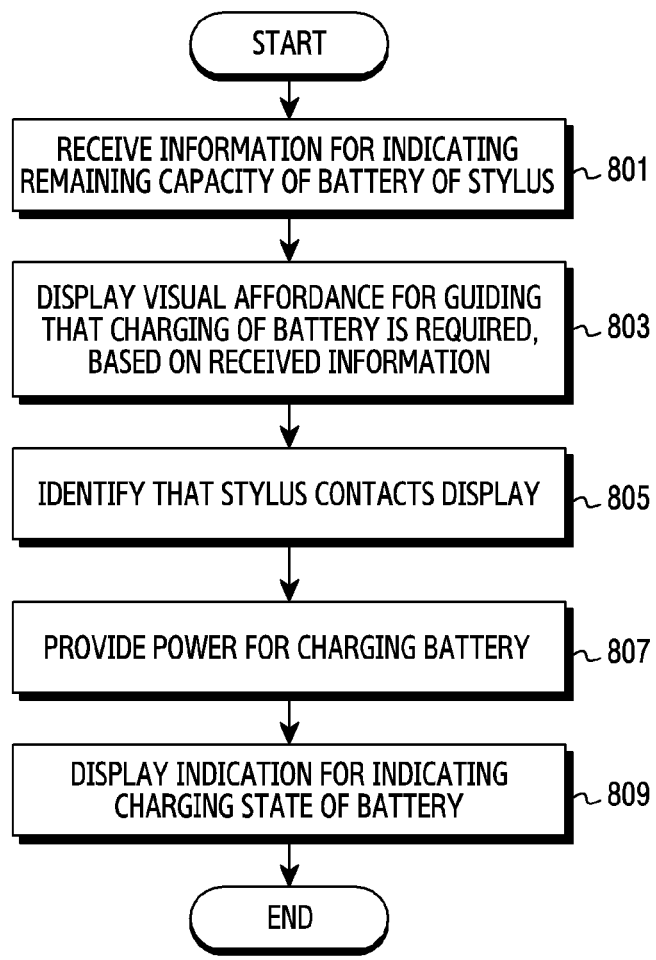
FIG. 8 is a view illustrating an example of an operation of the electronic device 101 according to various embodiments.

FIG. 8 is a view illustrating an example 800 of an operation of the electronic device 101 according to various embodiments. The operation may be performed by the electronic device 101 shown in FIG. 1, the electronic device 101 shown in FIG. 2, or the processor 120 of the electronic device 101.

Referring to FIG. 8, in operation 801, the processor 120 may receive information for indicating a remaining capacity of the battery 370 of the stylus (for example, the electronic device 102). For example, the processor 120 may receive the information for indicating the remaining capacity of the battery 370 of the stylus 102 through a communication path between the stylus 102 and the electronic device 101 by using the communication circuitry 190. In various embodiments, the communication path between the stylus 102 and the electronic device 102 may be established based on at least a part of the stylus 102 being detached from the holder of the housing of the electronic device 101. However, this should not be considered as limiting.

In operation 803, the processor 120 may display a visual affordance for guiding that charging of the battery 370 is required, based on the received information. In various embodiments, the processor 120 may provide at least one another affordance (for example, an auditory affordance, a haptic affordance, or the like) distinct from the visual affordance to the electronic device 101 or the stylus 102, based on the received information. According to embodiments, the at least one another affordance may be provided along with the visual affordance. In various embodiments, the visual affordance may be configured with at least one indication. For example, the visual affordance may include an indication for indicating the information regarding the remaining capacity of the battery 370. However, this should not be considered as limiting.

In operation 805, while displaying the visual affordance, the processor 120 may identify that the stylus 102 (or an end of the stylus 102) (for example, the tip 362 of FIG. 3) contacts the display 160. For example, while displaying the visual affordance, the processor 120 may identify that the stylus 102 contacts the display 160 based on a change of capacitance.

In operation 807, the processor 120 may provide power for charging the battery 370 in response to the identification. For example, the processor 120 may enable the detecting coil included in the electromagnetic induction panel 310 operatively coupled with the display 160 in response to the identification. For example, the processor 120 may enable the detecting coil by applying power to the detecting coil. The processor 120 may provide power for charging the battery 370 through an electromagnetic signal (for example, the electromagnetic signal 320) emitted from the enabled detecting coil. However, this should not be considered as limiting.

In operation 809, the processor 120 may display an indication for indicating a charging state of the battery 370 while providing the power for charging the battery 370. For example, while providing the power for charging the battery 370, the processor 120 may display an indication for indicating efficiency of the charging of the battery 370. In another example, while providing the power for charging the battery 370, the processor 120 may display an indication for indicating a change of the remaining capacity of the battery 370 caused by the charging. However, this should not be considered as limiting. In various embodiments, the indication may be displayed in various areas. For example, the indication may be displayed in the visual affordance. In another example, the indication may be displayed in the indicator area. However, this should not be considered as limiting. In various embodiments, the indication may further be used to indicate an area where the battery 370 can be charged through the display 160.

As described above, the electronic device 101 according to various embodiments may identify whether the charging of the battery 370 is required based on a state of the battery 370 of the stylus 102 related to the electronic device 101, and may display a visual affordance for indicating that the charging of the battery 370 is required based on it being identified that the charging of the battery 370 is required. The electronic device 101 according to various embodiments can provide an enhanced user experience by displaying the visual affordance. When it is identified that the end of the stylus 102 is positioned within a specified distance from the display 160 (or the visual affordance), the electronic device 101 according to various embodiments may provide power for charging the battery 370 by using the charging circuitry 210, and may display the indication for indicating the state of the battery 370 by using the display 160 while providing the power, such that an enhanced user experience can be provided.

Figure 9:
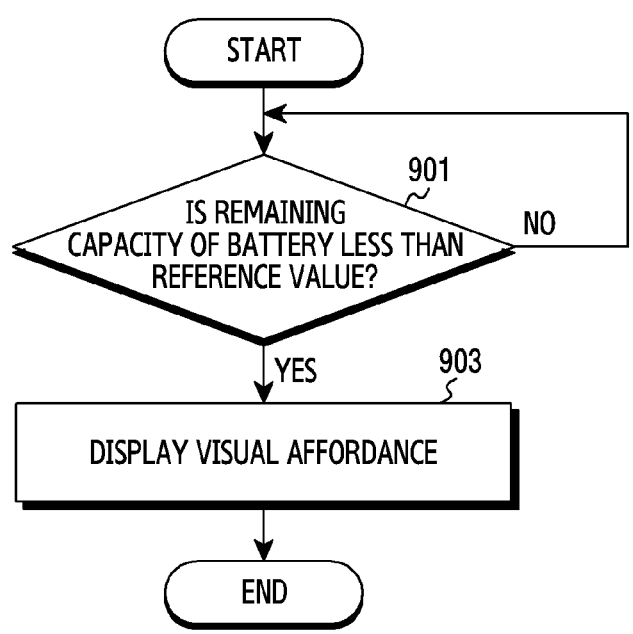
FIG. 9 is a view illustrating an example of an operation of the electronic device which determines whether to display a visual affordance based on information received from the stylus according to various embodiments.

FIG. 9 is a view illustrating an example 900 of an operation of the electronic device which determines whether to display a visual affordance based on information received from the stylus according to various embodiments. The operation may be performed by the electronic device 101 shown in FIG. 1, the electronic device 101 shown in FIG. 2, or the processor 120 of the electronic device 101.

Operation 901 and operation 903 of FIG. 9 may be related to operation 801 and operation 803 of FIG. 8.

Referring to FIG. 9, in operation 901, the processor 120 may identify whether the remaining capacity of the battery indicated by the information received from the stylus (for example, the electronic device 102 of FIG. 1 or 3) by using the communication circuitry 190 is less than a reference value. In various embodiments, the reference value may be configured in the electronic device 101 to check whether the electronic device 101 is in a context where the visual affordance is required to be displayed. In various embodiments, the reference value may be defined based on a user input or pre-defined. The processor 120 may perform operation 903 based on it being identified that the remaining capacity of the battery is less than the reference value. On the other hand, the processor 120 may be in a standby state until the information for indicating the remaining capacity of the battery is received again from the stylus 102, based on it being identified that the remaining capacity of the battery is greater than or equal to the reference value. For example, when the information for indicating the remaining capacity of the battery is transmitted at designated intervals, the processor 120 may perform operation 901 again based on a remaining capacity of the battery indicated by information received in the next period, based on it being identified that the remaining capacity of the battery is greater than or equal to the reference value. However, this should not be considered as limiting.

In operation 903, when it is identified that the remaining capacity of the battery is less than the reference value, the processor 120 may display the visual affordance by using the display 160.

As described above, the electronic device 101 according to various embodiments may display the visual affordance only in a context where the charging of the battery of the stylus 102 is required in order to efficiently use the display 160 having a restricted size. In other words, the electronic device 101 according to various embodiments can provide an enhanced user experience.

Figure 10:
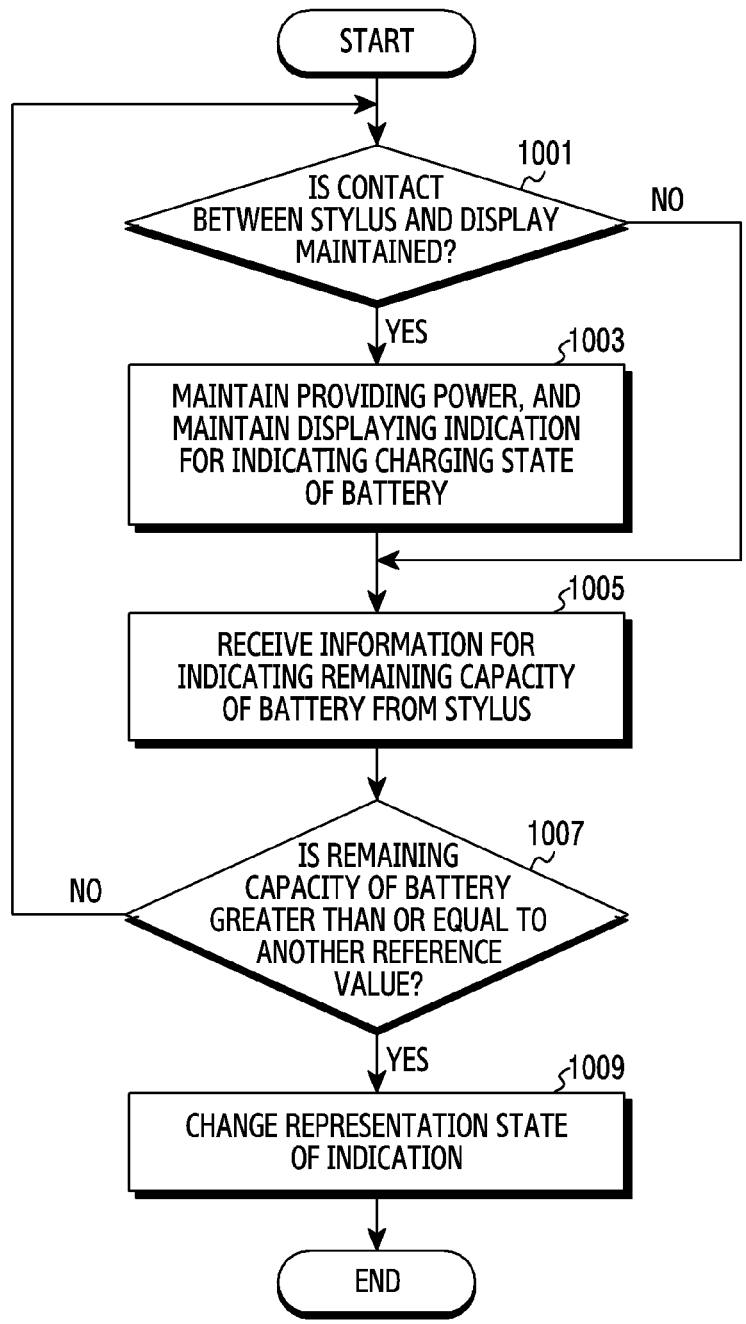
FIG. 10 is a view illustrating an example of an operation of the electronic device while providing power for charging the battery to the stylus according to various embodiments.

FIG. 10 is a view illustrating an example 1000 of an operation of the electronic device while providing power for charging the battery to the stylus according to various embodiments. The operation may be performed by the electronic device 101 shown in FIG. 1, the electronic device 101 shown in FIG. 2, or the processor 120 of the electronic device 101.

Operations 1001 to 1009 of FIG. 10 may be performed after operation 809 of FIG. 8.

Referring to FIG. 10, in operation 1001, the processor 120 may identify whether the contact between the stylus 102 and the display 160 is maintained while providing the power to the battery of the stylus (for example, the electronic device 102 of FIG. 1 or 3) or while displaying the indication for indicating the charging state of the battery. For example, the processor 120 may identify whether the contact between the stylus 102 and the display 160 is maintained while providing the power to the battery or while displaying the indication for identifying the charging state of the battery, based on a change of capacitance detected by the touch sensor related to the display 160. The processor 120 may perform operation 1003 based on it being identified that the contact is maintained. On the other hand, the processor 120 may perform operation 1005 based on it being identified that the contact is released.

In operation 1003, the processor 120 may maintain providing the power to the battery and may maintain displaying the indication for indicating the charging state of the battery, based on it being identified that the contact is maintained.

In operation 1005, the processor 120 may receive information for indicating a remaining capacity of the battery from the stylus 102 by using the communication circuitry 190 while performing operation 1003, after performing operation 1003, or after performing operation 1001.

In operation 1007, the processor 120 may identify whether the remaining capacity of the battery indicated by the information received in operation 1005 is greater than or equal to another reference value. In various embodiments, the another reference value may be distinct from the reference value defined through the description of FIG. 8. In various embodiments, the another reference value may be defined or configured in the electronic device 101 to identify or determine whether to change a representation state of the indication. In various embodiments, the another reference value may be higher than the reference value. For example, when the reference value is 40%, the another reference value may be set to 80%. The processor 120 may perform operation 1009 based on it being identified that the remaining capacity of the battery is greater than or equal to the another reference value. On the other hand, the processor 120 may perform operation 1001 again based on it being identified that the remaining capacity of the battery is less than the another reference value.

In operation 1009, the processor 120 may change the representation state of the indication based on it being identified that the remaining capacity of the battery is greater than or equal to the another reference value. For example, the processor 120 may cease displaying the indication based on it being identified that the remaining capacity of the battery is greater than or equal to the another reference value. In another example, the processor 120 may display the indication in a translucent state or may change a shape of the indication, based on it being identified that the remaining capacity of the battery is greater than or equal to the another reference value. When the indication is displayed in the translucent state or the shape of the indication is changed, the processor 120 may remove the indication displayed in the translucent state or the indication having the changed shape from the screen displayed through the display 160, based on it being identified that the battery is fully charged. However, this should not be considered as limiting.

As described above, the electronic device 101 according to various embodiments may change the representation state of the indication, based on at least one of a state of the battery of the stylus or a contact state between the stylus and the display 160, while providing the power for charging the battery of the stylus. The electronic device 101 according to various embodiments can provide an enhanced user experience through the above-described change.

As described above, a method for operating an electronic device (for example, the electronic device 101) according to various embodiments may include: receiving information for indicating a remaining capacity of a rechargeable battery of a stylus related to the electronic device from the stylus; displaying a visual affordance for indicating that charging of the battery is required, based on the received information; and, in response to identifying that the stylus contacts the display, providing power for charging the battery to the stylus through the display, and displaying an indication for indicating an efficiency of the charging in the visual affordance by using the display.

In various embodiments, displaying the visual affordance may include displaying the visual affordance in response to identifying that the remaining capacity of the battery indicated by the received information is less than a reference value.

In various embodiments, the visual affordance may further include an indication for indicating information regarding the remaining capacity of the battery indicated by the received information.

In various embodiments, the method may further include changing a representation of the displayed indication, based on identifying that the efficiency of the charging is changed while providing the power to the stylus by using the charging circuitry. In various embodiments, the change of the efficiency of the charging may be caused by at least one of a change of a distance between the stylus and the charging circuitry, or a change of a posture of the stylus. In various embodiments, changing the representation of the indication may include changing the representation of the displayed indication by changing a size of the indication, based on identifying that the efficiency of the charging is changed while providing the power to the stylus by using the charging circuitry.

In various embodiments, the method may further include ceasing displaying the visual affordance including the indication in response to information for indicating that the battery is fully charged being received by using the communication circuitry.

In various embodiments, the visual affordance may include another indication for guiding that the battery can be charged by contact with the visual affordance before the identification, and the indication may be changed from the another indication in response to the identification.

In various embodiments, the electronic device may further include a housing to mount a charging circuitry and the display and the display may be exposed through at least a part of the housing, and the charging circuitry may be disposed under at least a part of the display. In various embodiments, the visual affordance may be displayed within an area disposed on the charging circuitry in the full display area of the display.

As described above, a method for operating an electronic device according to various embodiments may include: receiving information regarding a remaining capacity of a rechargeable battery of a stylus related to the electronic device from the stylus; based on identifying that the remaining capacity of the battery is less than a reference value, displaying a first indication for guiding that charging of the battery is required; and, in response to identifying that the stylus contacts the display while displaying the first indication, providing power for charging the battery to the stylus through the display, and changing the first indication to a second indication for indicating that the battery is being charged by using the display.

In various embodiments, displaying the first indication may include displaying the first indication for guiding that the charging of the stylus is required in an indicator area of a full display area of the display by using the display, based on identifying that the remaining capacity of the battery is less than the reference value. In various embodiments, the method may further be configured to display a screen in at least a part of the other area of the full display area of the display along with the first indication, and the indicator area may be maintained independently from transition of the screen displayed on the at least part of the other area.

In various embodiment, the method may further include ceasing displaying the second indication based on it being identified that the stylus is separated from the display. In various embodiments, the method may further include: identifying that the stylus is separated from the display; and, in response to identifying that the remaining capacity of the battery is less than the reference value at a time that the stylus is separated from the display, ceasing displaying the second indication by changing the second indication to the first indication.

In various embodiments, the method may further include: while providing the power and displaying the second indication, receiving another information regarding the remaining capacity of the battery from the stylus by using the communication circuitry; identifying that the battery is fully charged based on the another information; and, in response to it being identified that the battery is fully charged, changing the second indication to a third indication for indicating that the battery is fully charged.

In various embodiments, the second indication may further be used to indicate a change of the remaining capacity of the battery while providing the power.

In various embodiments, the method may further include ceasing displaying the first indication based on identifying that a connection between the stylus and the electronic device is terminated.

In various embodiment, displaying the first indication may include: displaying a third indication for indicating that the stylus is connected to the electronic device while maintaining a connection between the stylus and the electronic device; and, based on identifying that the remaining capacity of the battery is less than the reference value while displaying the third indication, displaying the first indication changed from the third indication by using the display. In various embodiments, the method may further include maintaining displaying the third indication based on identifying that the remaining capacity of the battery is greater than or equal to the reference value while displaying the third indication.

The electronic device and the method thereof according to various embodiments can provide an enhanced user experience by displaying an affordance for providing charging of the battery of the external device through the display.

The effects achieved by the disclosure are not limited to those mentioned above, and other effects that are not mentioned above may be clearly understood to those skilled in the art based on the description provided below.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a housing comprising a first plate and a second plate facing in an opposite direction of the first plate;
   a touch screen display panel visible through at least a part of the first plate;
   at least one conductive coil disposed inside the display panel or adjacent to the display panel and configured to generate an electromagnetic wave through the first plate;
   a wireless communication circuitry disposed inside the housing;
   a processor disposed inside the housing and operatively connected with the display panel, the wireless communication circuitry, and the at least one conductive coil; and
   a memory operatively connected with the processor and storing instructions that, when executed by the processor, cause the processor to:
      receive charging state information of a charge storage element from a stylus pen comprising the charge storage element through the wireless communication circuitry;
      determine an amount of an electric charge of the charge storage element based at least in part on the received information; and
      provide a graphic user interface (GUI) on the display panel to display a position of the at least one conductive coil based at least in part on the determination.

2. The electronic device of claim 1, wherein the charge storage element comprises a capacitor or a battery.

3. The electronic device of claim 1, wherein the memory stores instructions that, when executed by the processor, cause the processor to:
   detect the stylus pen on the position of the at least one conductive coil by using the display panel; and
   in response to the detection, apply a current to the at least one conductive coil.

4. The electronic device of claim 3, wherein the memory stores instructions that, when executed by the processor, cause the processor to display an indication for indicating a charging progress state of a battery in the user interface while applying the current.

5. The electronic device of claim 4, wherein the charging progress state of the battery comprises at least one of a charging progress efficiency of the battery or information regarding a remaining charging capacity of the battery.

6. The electronic device of claim 1, wherein the memory stores instructions that, when executed by the processor, cause the processor to further receive charging state information of a battery from the stylus pen by using the wireless communication circuitry while applying a current.

7. The electronic device of claim 6, wherein the memory stores instructions that, when executed by the processor, cause the processor to change and display an indication in the user interface in response to the charging state information of the battery being further received from the stylus pen while applying the current.

8. The electronic device of claim 1, wherein the memory stores instructions that, when executed by the processor, cause the processor to cease providing the user interface in response to information for indicating that a battery is fully charged being received from the stylus pen by using the wireless communication circuitry.

9. The electronic device of claim 1, wherein the wireless communication circuitry is configured to supply at least one of Bluetooth standards or Bluetooth low energy (BLE) communication.

10. An electronic device comprising:
    a charging circuitry;
    a communication circuitry;
    a display;
    a processor; and
    a memory configured to store instructions that, when executed by the processor, cause the processor to:

receive information for indicating a remaining capacity of a rechargeable battery of a stylus related to the electronic device from the stylus by using the communication circuitry, display a visual affordance for indicating that charging of the battery is required by using the display based on the received information, and in response to identifying that the stylus contacts the display:

provide power for charging the battery by using the charging circuitry to the stylus, and display an indication for indicating an efficiency of the charging in the visual affordance by using the display.

11. An electronic device comprising:

a charging circuitry;

a communication circuitry;

a display;

a processor; and a memory configured to store instructions that, when executed by the processor, cause the processor to:

receive information regarding a remaining capacity of a rechargeable battery of a stylus related to the electronic device from the stylus by using the communication circuitry, based on identifying that the remaining capacity of the battery is less than a reference value, display a first indication for guiding that charging of the battery is required by using the display, and in response to identifying that the stylus contacts the display while displaying the first indication:

provide power for charging the battery by using the charging circuitry to the stylus, and change the first indication to a second indication for indicating that the battery is being charged by using the display.

12. The electronic device of claim 11, wherein the memory stores instructions that, when executed by the processor, cause the processor to display the first indication for guiding that the charging of the stylus is required in an indicator area of a full display area of the display by using the display based on identifying that the remaining capacity of the battery is less than the reference value.

13. The electronic device of claim 12, wherein the memory stores instructions that, when executed by the processor, cause the processor to display a screen in at least a part of the other area of the full display area of the display along with the first indication; and wherein the indicator area is maintained independently from transition of the screen displayed on the at least part of the other area.

14. The electronic device of claim 11, wherein the memory stores instructions that, when executed by the processor, cause the processor to cease displaying the second indication based on identifying that the stylus is separated from the display.

15. The electronic device of claim 14, wherein the memory stores instructions that, when executed by the processor, cause the processor to:

identify that the stylus is separated from the display; and in response to identifying that the remaining capacity of the battery is less than the reference value at a time that the stylus is separated from the display, cease displaying the second indication by changing the second indication to the first indication.

16. The electronic device of claim 11, wherein the memory stores instructions that, when executed by the processor, cause the processor to:

while providing the power and displaying the second indication, receive another information regarding the remaining capacity of the battery from the stylus by using the communication circuitry;

identify that the battery is fully charged based on the another information; and in response to identifying that the battery is fully charged, change the second indication to a third indication for indicating that the battery is fully charged.

17. The electronic device of claim 11, wherein the second indication is further used to indicate a change of the remaining capacity of the battery while providing the power.

18. The electronic device of claim 11, wherein the memory stores instructions that, when executed by the processor, cause the processor to cease displaying the first indication based on identifying that a connection between the stylus and the electronic device is terminated.

19. The electronic device of claim 11, wherein the memory stores instructions that, when executed by the processor, cause the processor to:

display a third indication for indicating that the stylus is connected to the electronic device while maintaining a connection between the stylus and the electronic device; and based on identifying that the remaining capacity of the battery is less than the reference value while displaying the third indication, display the first indication changed from the third indication by using the display.

20. The electronic device of claim 19, wherein the memory stores instructions that, when executed by the processor, cause the processor to maintain displaying the third indication based on identifying that the remaining capacity of the battery is greater than or equal to the reference value while displaying the third indication.

* * * * *